(12) United States Patent
Lee

(10) Patent No.: US 10,484,152 B2
(45) Date of Patent: Nov. 19, 2019

(54) METHOD AND APPARATUS FOR TRANSMITTING OR RECEIVING REFERENCE SIGNAL IN BEAMFORMING COMMUNICATION SYSTEM

(71) Applicant: Samsung Electronics Co., Ltd., Suwon-si, Gyeonggi-do (KR)

(72) Inventor: Hyun-Yong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/767,261

(22) PCT Filed: Nov. 2, 2016

(86) PCT No.: PCT/KR2016/012546
§ 371 (c)(1),
(2) Date: Apr. 10, 2018

(87) PCT Pub. No.: WO2017/078413
PCT Pub. Date: May 11, 2017

(65) Prior Publication Data
US 2019/0058558 A1    Feb. 21, 2019

Related U.S. Application Data

(60) Provisional application No. 62/249,586, filed on Nov. 2, 2015.

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0695* (2013.01); *H04B 7/088* (2013.01);
(Continued)

(58) Field of Classification Search
CPC ... H04B 7/0695; H04B 7/088; H04L 27/2613; H04L 27/2655; H04L 5/0007;
(Continued)

(56) References Cited

U.S. PATENT DOCUMENTS

2006/0028976 A1* 2/2006 Park ..................... H04L 5/0023
370/203
2008/0267165 A1* 10/2008 Bertrand ........... H04W 56/0005
370/350

(Continued)

FOREIGN PATENT DOCUMENTS

KR    10-2014-0059598 A    5/2014
KR    10-2014-0129625 A    11/2014
WO       2015/109153 A1    7/2015

OTHER PUBLICATIONS

European Search Report dated Sep. 6, 2018, issued in European Application No. 16862429.4.

*Primary Examiner* — Stephen J Clawson
(74) *Attorney, Agent, or Firm* — Jefferson IP Law, LLP

(57) ABSTRACT

The present disclosure relates to a 5G or pre-5G communication system for supporting a higher data rate beyond a 4G communication system such as LTE. Disclosed is a method and apparatus for transmitting or receiving a reference signal in a beamforming communication system. The method comprises the steps of: generating a reference signal sequence for a reference signal that can be used for beam searching; mapping the reference signal sequence to modulation symbols corresponding to resource elements having a predetermined identical subcarrier spacing among resource elements that can be used to transmit the reference signal; generating an OFDM symbol signal including the modulation symbols; and transmitting the OFDM symbol signal using at least one
(Continued)

predetermined transmission beam among transmission beams that can be used by a base station.

26 Claims, 23 Drawing Sheets

(51) Int. Cl.

| | | |
|---|---|---|
| *H04B 7/08* | (2006.01) | |
| *H04L 27/26* | (2006.01) | |
| *H04W 16/28* | (2009.01) | |
| *H04W 56/00* | (2009.01) | |
| *H04W 72/04* | (2009.01) | |
| *H04W 88/08* | (2009.01) | |

(52) U.S. Cl.
CPC .......... *H04L 5/0007* (2013.01); *H04L 5/0023* (2013.01); *H04L 5/0083* (2013.01); *H04L 5/0094* (2013.01); *H04L 27/2613* (2013.01); *H04W 16/28* (2013.01); *H04W 56/001* (2013.01); *H04W 72/044* (2013.01); *H04L 5/0057* (2013.01); *H04L 5/0073* (2013.01); *H04L 27/2655* (2013.01); *H04W 88/08* (2013.01)

(58) Field of Classification Search
CPC ... H04L 5/0023; H04L 5/0048; H04L 5/0057; H04L 5/0073; H04L 5/0083; H04L 5/0094; H04W 16/28; H04W 56/001; H04W 72/044; H04W 88/08

USPC ........................................................ 370/329
See application file for complete search history.

(56) References Cited

U.S. PATENT DOCUMENTS

| | | |
|---|---|---|
| 2010/0272040 A1 | 10/2010 | Nam et al. |
| 2012/0027004 A1 | 2/2012 | Ko et al. |
| 2012/0150353 A1 | 6/2012 | Bassa |
| 2013/0128807 A1 | 5/2013 | Vermani et al. |
| 2013/0182683 A1* | 7/2013 | Seol ............... H04W 72/046 370/335 |
| 2013/0215844 A1* | 8/2013 | Seol ............... H04W 72/046 370/329 |
| 2013/0315321 A1 | 11/2013 | Rajagopal et al. |
| 2014/0004898 A1 | 1/2014 | Yu et al. |
| 2014/0010178 A1 | 1/2014 | Yu et al. |
| 2014/0128067 A1 | 5/2014 | Lim et al. |
| 2014/0198696 A1* | 7/2014 | Li ................... H04W 52/0229 370/311 |
| 2014/0321313 A1* | 10/2014 | Seo ..................... H04J 11/00 370/252 |
| 2014/0323143 A1 | 10/2014 | Jung et al. |
| 2014/0334454 A1 | 11/2014 | Nogami et al. |
| 2015/0009951 A1 | 1/2015 | Josiam et al. |
| 2015/0236774 A1* | 8/2015 | Son ................... H04B 7/0628 375/267 |
| 2015/0257073 A1 | 9/2015 | Park et al. |
| 2015/0280876 A1 | 10/2015 | You et al. |
| 2016/0192297 A1* | 6/2016 | Kim ................... H04W 52/42 455/522 |

* cited by examiner

METHOD AND APPARATUS FOR TRANSMITTING OR RECEIVING REFERENCE SIGNAL IN BEAMFORMING COMMUNICATION SYSTEM

CROSS-REFERENCE TO RELATED APPLICATION(S)

This application is a U.S. National Stage application under 35 U.S.C. § 371 of an International application number PCT/KR2016/012546, filed on Nov. 2, 2016, which is based on and claimed priority under 35 U.S.C. § 119(e) of a U.S. Provisional application Ser. No. 62/249,586, filed on Nov. 2, 2015, in the U.S. Patent and Trademark Office, the disclosure of which is incorporated by reference herein in its entirety.

BACKGROUND

1. Field

The present disclosure relates to a method and apparatus for transmitting and receiving a reference signal for supporting an effective beam search in a extremely high frequency (mmWave) analog beamforming communication system.

2. Description of the Related Art

In order to meet wireless data traffic demands, which have increased since the commercialization of the 4th Generation (4G) communication system, efforts to develop an improved 5G communication system or a pre-5G communication system have been made. For this reason, the 5G communication system or the pre-5G communication system is called a beyond-4G-network-communication system or a post-LTE system.

In order to achieve a high data transmission rate, implementation of the 5G communication system in an ultrahigh frequency (mmWave) band (e.g., 60 GHz band) is being considered. In the 5G communication system, technologies such as beamforming, massive MIMO, full dimensional MIMO (FD-MIMO), array antenna, analog beamforming, and large scale antenna technologies are being discussed as means to mitigate propagation path loss in the ultrahigh frequency band and increase a propagation transmission distance.

Further, the 5G communication system has developed technologies such as an evolved small cell, an advanced small cell, a cloud radio access network (cloud RAN), an ultra-dense network, device-to-device communication (D2D), a wireless backhaul, a moving network, cooperative communication, coordinated multi-points (CoMP), and received interference cancellation to improve the system network.

In addition, the 5G system has developed advanced coding modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA).

An mmWave frequency band may use a broadband frequency of several GHz in order to support rapid increase of mobile traffic. A standard specification for supporting an mmWave band is an IEEE 802.11ad (e.g., wireless gigabit alliance (WiGiG)) standard of a 60 Ghz frequency band, and companies such as Samsung Inc., Nokia Inc., Ericsson Inc., Docomo Inc., Intel Inc., Qualcomm Inc., and/or the like have developed various frequency candidate groups such as 15 Ghz, 28 GHz, 38 GHz, 44 GHz, 70 GHz, and/or the like for a next generation mobile 5G communication standard.

The mmWave frequency band has great path attenuation compared to an existing frequency band. However, the mmWave frequency may obtain a link budget required for a high antenna gain and a wireless communication by mounting a plurality of array antennas within a given physical space and applying a beamforming (BF) technology according to a short-wave characteristic of an electric wave.

In a beamforming communication system, a stable communication is possible only if best beams are applied between a base station (BS)(or it will be referred to as Node B) and a terminal (e.g., a mobile station (MS)). Further, in a case that a best beam is changed in a situation that a terminal moves, there is a need for tracing rapidly the change of the best beam. So, it is very important to provide a technology which may rapidly and correctly search a best beam between a base station and a terminal in a beamforming communication.

Recently, a scheme of providing a mobile service using an mmWave frequency band has been discussed. In this case, a handover technology of a multi-cell environment is necessary for providing a continuous and seamless service, it is very important to provide a scheme of obtaining independent channel information per base station for a terminal to select a serving base station.

So, there is a need for a technology for effectively obtaining channel information for cells and beams in a base station and terminal system which operate a plurality of analog beams.

SUMMARY

The present disclosure provides a method and apparatus for transmitting and receiving a reference signal in a communication system.

The present disclosure provides a method and apparatus for performing an effective beam search in an analog beamforming wireless communication system of an mmWave frequency band.

The present disclosure provides a method and apparatus for effectively transmitting and receiving a reference signal which may be used for a beam search in a beamforming communication system.

The present disclosure provides a method and apparatus for effectively obtaining channel information per beam of a plurality of base stations in an analog beamforming communication system.

The present disclosure provides a method and apparatus for enabling to perform channel estimation effectively for multiple cells.

The present disclosure provides a method and apparatus for maintaining orthogonality among base station signals on multi-cell transmission in an analog beamforming communication of an mmWave frequency band.

According to an embodiment of the present disclosure, a method for transmitting a reference signal in a beamforming communication system is provided. The method comprises generating a reference signal sequence for a reference signal capable of being used for a beam search, mapping the reference signal sequence to modulation symbols which correspond to resource elements with same subcarrier spacing which is predetermined among resource elements capable of being used for transmitting the reference signal, generating an orthogonal frequency division multiplex (OFDM) symbol signal including the modulation symbols, wherein the OFDM symbol signal is configured such that a same sequence pattern is repeated a predetermined number of times by a period of a predetermined sub-symbol duration on a time domain, and transmitting the OFDM symbol signal using at least one predetermined transmission beam among transmission beams capable of being used by a base station.

According to an embodiment of the present disclosure, a method for receiving a reference signal in a beamforming communication system is provided. The method comprises receiving an OFDM symbol signal including a reference signal sequentially using a plurality of reception beams per pre-designated sub-symbol durations, performing fast fourier transform (FFT) operations on signals of the sub-symbol durations of the OFDM symbol signal, wherein the OFDM symbol signal is configured such that a same sequence pattern is repeated a predetermined number of times by a period of a predetermined sub-symbol duration on a time domain, generating channel information which corresponds to the plurality of reception beams using signals which are obtained through the FFT operations, and selecting a preferred reception beam from among the reception beams using the channel information.

According to an embodiment of the present disclosure, an apparatus within a base station transmitting a reference signal in a beamforming communication system is provided. The apparatus comprises a baseband transmitter configured to generate a reference signal sequence for a reference signal capable of being used for a beam search, to map the reference signal sequence to modulation symbols which correspond to resource elements with same subcarrier spacing which is predetermined among resource elements capable of being used for transmitting the reference signal, and to generate an OFDM symbol signal including the modulation symbols, wherein the OFDM symbol signal is configured such that a same sequence pattern is repeated a predetermined number of times on a time domain, and a radio frequency (RF) transmitting unit configured to transmit the OFDM symbol signal using at least one predetermined transmission beam among transmission beams capable of being used by a base station.

According to an embodiment of the present disclosure, an apparatus within a terminal receiving a reference signal in a beamforming communication system is provided. The apparatus comprises an RF receiving unit configured to receive an OFDM symbol signal including a reference signal sequentially using a plurality of reception beams per pre-designated sub-symbol durations, wherein the OFDM symbol signal is configured such that a same sequence pattern is repeated a predetermined number of times by a period of a predetermined sub-symbol duration on a time domain, and a base band receiver configured to perform fast fourier transform (FFT) operations on signals of the sub-symbol durations of the OFDM symbol signal, to generate channel information which corresponds to the plurality of reception beams using signals which are obtained through the FFT operations, and to select a preferred reception beam from among the reception beams using the channel information.

BRIEF DESCRIPTION OF THE DRAWINGS

The above and other aspects, features, and advantages of the present disclosure will be more apparent from the following detailed description taken in conjunction with the accompanying drawings, in which.

It should be construed that like reference numerals are used for illustrating the same or similar elements, features, and structures, throughout the above drawings.

DETAILED DESCRIPTION

Figure 1:
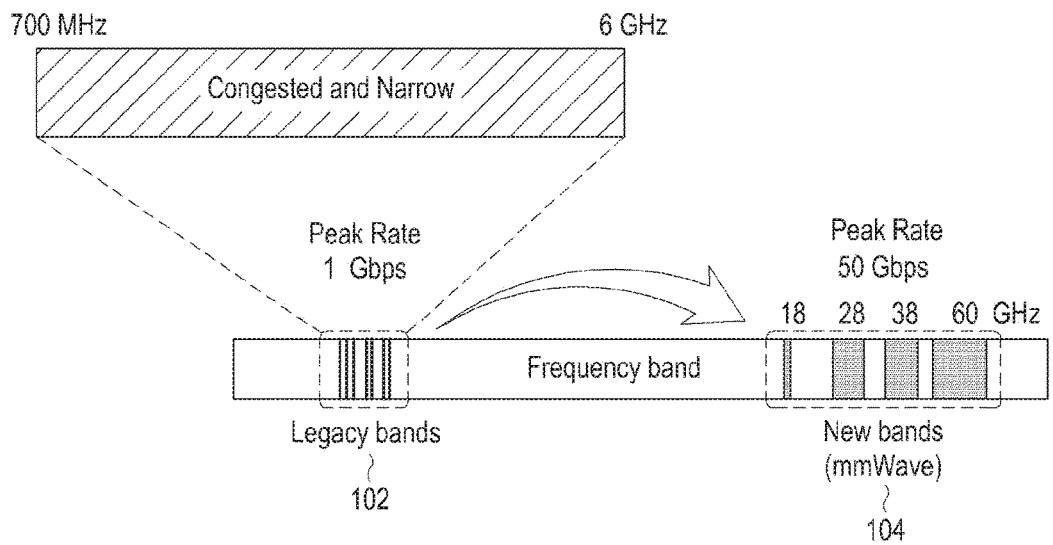
FIG. 1 illustrates a comparison of an mmWave frequency band and an existing frequency band.

Hereinafter, various embodiments of the present disclosure will be described in detail with reference to the accompanying drawings.

In describing embodiments, a description of technical details well known in the art to which the present disclosure pertains and not directly associated with the present disclosure will be omitted. This omission of the unnecessary description is intended to prevent the main idea of the present disclosure from being unclear and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the claimed scope of the present disclosure is not limited to embodiments set forth below, but may be implemented in various different forms. The present embodiments are provided only to complete the description and only to completely inform those skilled in the art to which embodiments of the present disclosure, and the scope of protection of the present disclosure is defined only by the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Here, the term "~ unit" as used in embodiments of the present disclosure means a software or hardware component, such as a field-programmable gate array (FPGA) or an application specific integrated circuit (ASIC), and the "~ unit" performs any functions. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

In the detailed descriptions of the embodiments of the present disclosure, an orthogonal frequency division multiplex (OFDM)-based wireless communication system will mainly described. The subject matter of the present specifications can be applied to other communication systems and services having similar technical backgrounds without departing from the scope disclosed in the present specifications, and the application thereof can be determined by those skilled in the art.

FIG. 1 illustrates a comparison of an mmWave frequency band and an existing frequency band.

Referring to FIG. 1, a frequency band 102 used in an existing communication system is generally within a range of 700 Mhz to 6 GHz, and a peak transmission rate (Peak Rate) is limited to 1 Gbps. Meanwhile, an mmWave frequency band 104 includes a frequency group such as 15 Ghz, 28 GHz, 38 GHz, 44 GHz, and 70 GHz, and may support a peak transmission rate.

Figure 2:
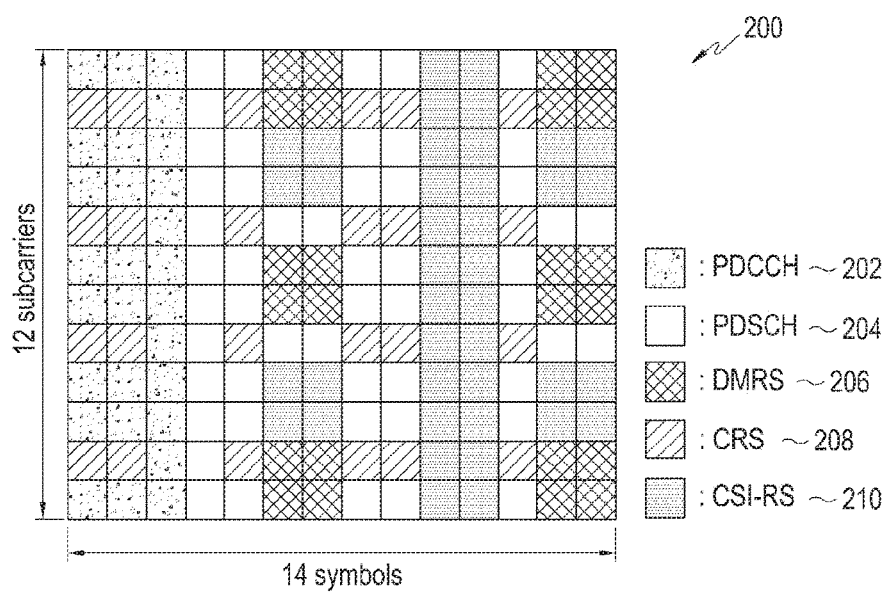
FIG. 2 illustrates a resource structure of a CSI-RS for extracting downlink channel information in an LTE cellular system.

FIG. 2 illustrates a resource structure of a CSI-RS for extracting downlink channel information in an LTE cellular system.

Referring to FIG. 2, one resource block (RB) 200 may consist of a plurality of subcarriers, e.g., 12 subcarriers on a frequency domain and a plurality of symbols, e.g., 14 symbols on a time domain, and includes a plurality of resource elements (REs) which are identified by a subcarrier and a symbol. One RB 200 may be used for carrying a physical downlink control channel (PDCCH) 202, a physical downlink shared channel (PDSCH) 204, a demodulation reference signal (DMRS) 206, a cell-specific reference signal (CRS) 208, or a channel state information reference signal (CSI-RS) 210 within each RE.

An LTE specification allocates a CRS or a CSI-RS used for measuring state of a channel on specific REs of all RBs. An LTE communication assumes antenna transmission of a fixed scheme, so a terminal may obtain information about a channel from a CRS and a CSI-RS.

In an LTE specification, REs for a CRS and a CSI-RS are allocated as scattered as possible within an RB 200 of a given structure, and remaining REs are allocated for a PDCCH and a PDSCH for transmitting control information and data. So, transmission of a PDCCH/PDSCH and transmission of a CRS/CSI-RS may be performed at the same time during one symbol.

In an analog beamforming communication, a base station and a terminal may form a plurality of (analog) beams which have different beam directions using an array antenna(s), and measure channel state for possible beam combinations (beam pairs) of transmission beams and reception beams to select a best beam (combination). If PDCCH/PDSCH transmission and CRS/CSI-RS transmission are on the same time duration (e.g., a symbol), a terminal may perform channel measurement on a CRS/CSI-RS for only a beam direction same as the PDCCH/PDSCH transmission. This is why an analog beamforming scheme may transmit a signal on only one beam direction during the same time duration. So, there is a need for allocating a reference signal which may be used for channel measurement, i.e., a beam search for transmission/reception beam combinations.

In embodiments to be described below, transmission of a reference signal which may be used for a beam search is separated from transmission of a PDCCH/PDSCH signal for transmitting control information and data on a time domain, so it is possible to independently operate a beam in a base station and a terminal.

Meanwhile, a terminal needs to receive full OFDM symbols for obtaining channel state for one beam combination upon transmitting a reference signal within a fixed RB structure. For a terminal to complete a beam search within short time in a situation in which the terminal moves at a high speed, OFDM symbols of which the number is equal to the number of required beam combinations are allocated, and this causes huge system overhead. Embodiments to be described below provide a technology of decreasing system overhead and optimize a beam search procedure.

An mmWave frequency band has a relatively short sample duration since the mmWave frequency band uses a broadband frequency compared to an existing frequency band, so absolute time of a cyclic prefix (CP) duration within an OFDM symbol becomes short due to this. In a multi-cell environment, if a signal which is out of a CP duration is received in a terminal, orthogonality among signals is broken, so it is difficult for the terminal to normally process signals. Due to this, relative effect on a global positioning system (GPS) error and propagation delay difference with the same level becomes very large compared to an existing frequency band. Embodiments to be described below provide a technology which may maintain orthogonality among reference signals among base stations in a multi-cell environment.

In an analog beamforming situation, if a beam search is not correctly performed within given time, a link budget is not sufficiently obtained, so a serious problem such as a case that a communication between a base station and a terminal is disconnected may occur. So, embodiments to be described below provide a technology in which a beam search may be effectively and stably performed on an mmWave frequency band which uses an analog beamforming.

Figure 3:
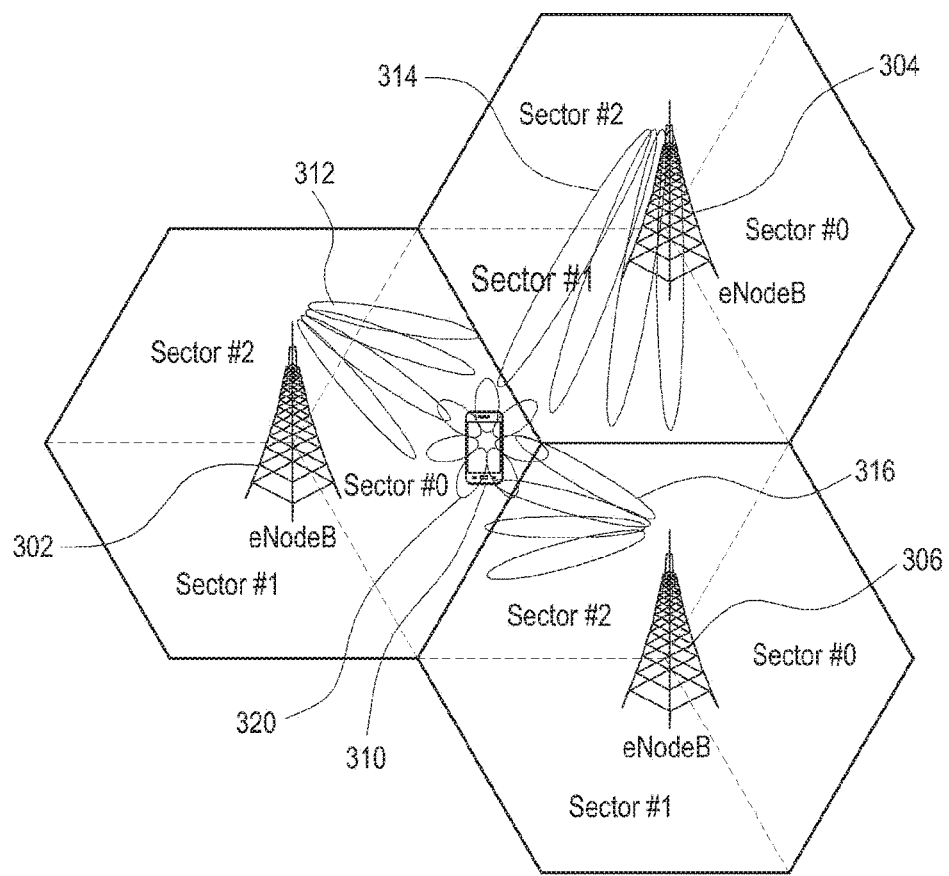
FIG. 3 illustrates an example of a communication system of a multi-cell environment using an analog beamforming technology in an mmWave frequency band according to an embodiment of the present disclosure.

FIG. 3 illustrates an example of a communication system of a multi-cell environment using an analog beamforming technology in an mmWave frequency band according to an embodiment of the present disclosure.

Referring to FIG. 3, three neighbor base stations (e.g., enhanced Node Bs (eNodeBs)) 302, 304, and 306 are illustrated, and each base station 302, 304, and 306 may transmit signals through transmission beams 312, 314, and 316 of each base station 302, 304, and 306 for covering a cell of each base station 302, 304, and 306 which is classified into three sectors. A terminal 310 may receive signals transmitted through transmission beams 312, 314, and 316 from the three base stations 302, 304, and 306 through reception beams 320 of the terminal 310.

All of the base stations 302, 304, and 306 and the terminal 310 may use analog beamforming, and the terminal 310 searches a best beam combination from among combinations of transmission beams of all neighbor base stations 302, 304, and 306 of the terminal 310 and reception beams of the terminal 310 for a smooth communication. For supporting the search, each base station 302, 304, and 306 transmits reference signals which may be used for downlink channel measurement through all transmission beams 312, 314, and 316 of each base station 302, 304, and 306, and the terminal 310 selects a best reception beam using the reference signals and feeds back channel information which corresponds to the selected reception beam to a corresponding base station B 302, 304, and 306. Here, the channel information may include, for example, at least one of a beam ID (BID), channel quality information (CQI), a rank indicator (RI), and a precoding matrix indicator (PMI).

In various embodiments of the present disclosure, a reference signal which may be used for a beam search will be referred to as beam reference signal (BRS) or beam refinement reference signal (BR-RS).

Figure 4:
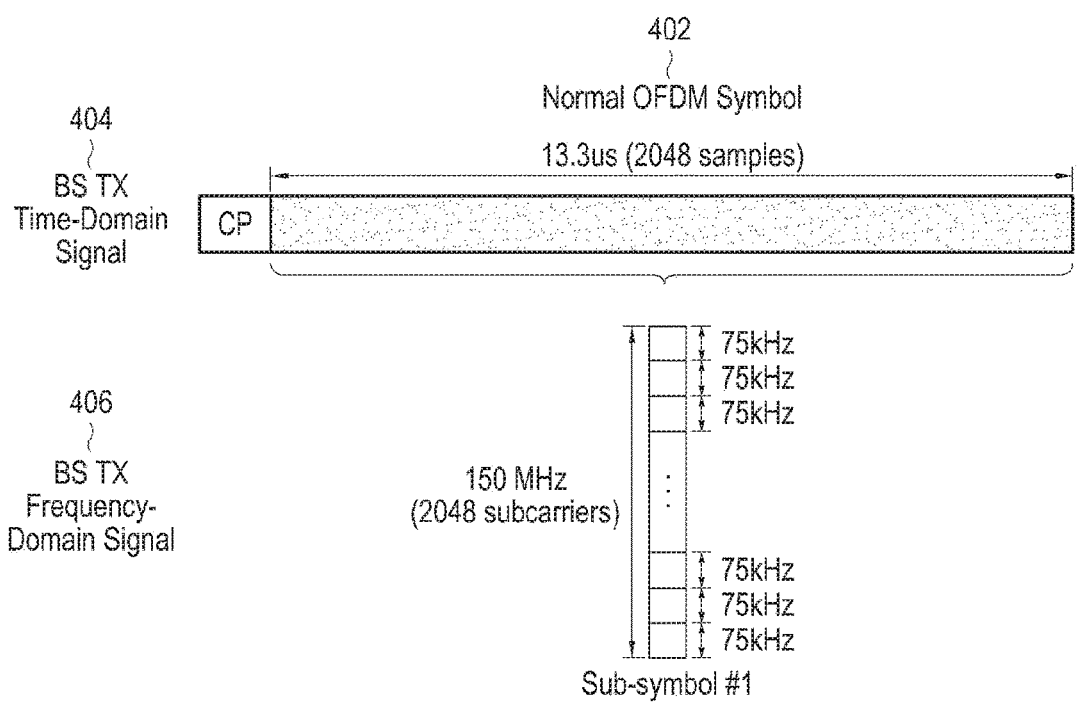
FIG. 4 illustrates configuration of a normal OFDM symbol which may be applied to an embodiment of the present disclosure.

FIG. 4 illustrates configuration of a normal OFDM symbol which may be applied to an embodiment of the present disclosure. Here, for describing various embodiments of the present disclosure, it will be defined that subcarrier spacing is 75 kHz (15 kHz×5), and an analog beamforming communication system in which an OFDM symbol duration is 13.3 micro second (us) will be assumed.

Referring to FIG. 4, a time domain signal 404 of an OFDM symbol 402 occupies time length of 13.3 us and includes 2048 samples. A frequency domain signal 406 of the OFDM symbol 402 occupies a frequency band of 150 MHz and includes 2048 subcarriers. Spacing of each subcarrier is 75 kHz.

A terminal may transition to a frequency domain signal 406 to obtain channel information only if the terminal receives all samples of a time domain signal 404. So, a shown sample structure may be used for only obtaining channel information for one beam direction.

In embodiments to be described below, a reference signal may be configured such that the same patterns are repeated a predetermined times R during one symbol duration on a time domain thereby being used for an effective beam search.

Figure 5:
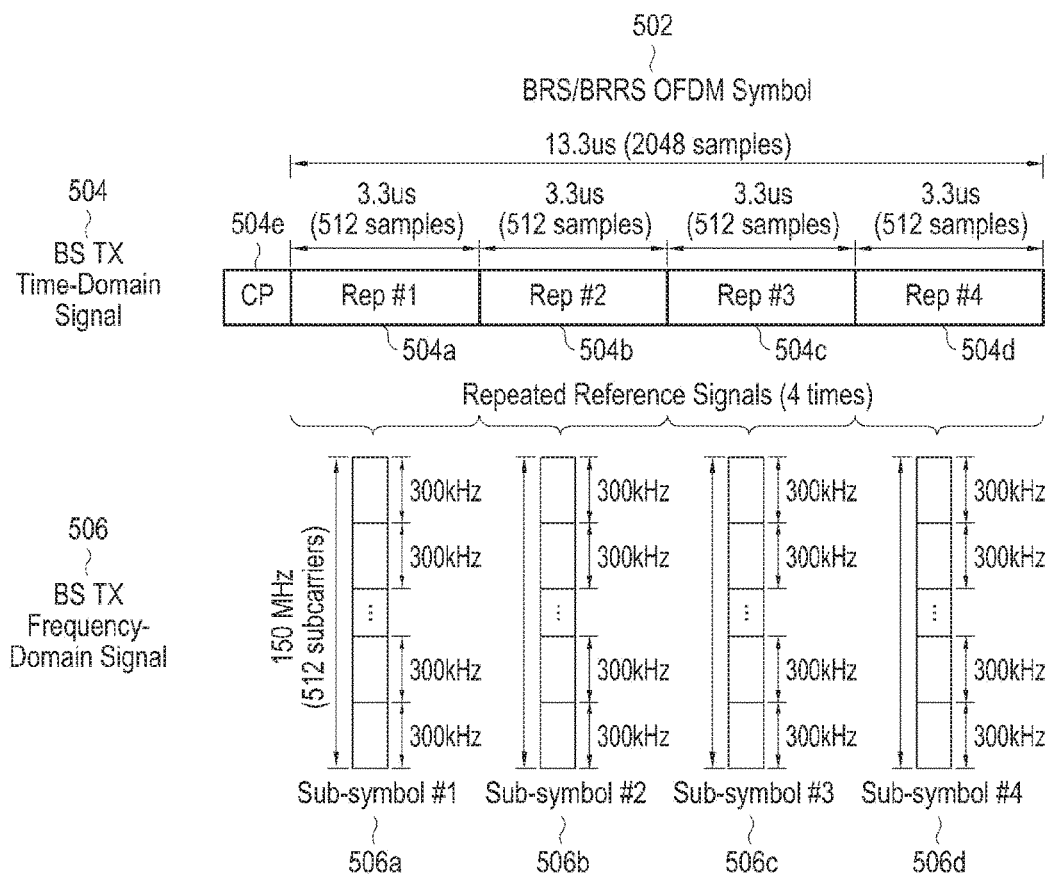
FIG. 5 illustrates configuration of an OFDM symbol for carrying a reference signal according to an embodiment of the present disclosure.

FIG. 5 illustrates configuration of an OFDM symbol for carrying a reference signal according to an embodiment of the present disclosure.

Referring to FIG. 5, samples which constitutes a time domain signal 504 of an OFDM symbol 502 including a reference signal are divided into R sample groups 504a, 504b, 504c, and 504d, and each sample group constitutes a sub-symbol 506a, 506b, 506c, and 506d. An example in a case of R=4 is illustrated here. Four sample groups 504a, 504b, 504c, and 504d have the same sequence pattern which consists of 512 samples of 3 us, so the same sequence pattern is repeated four times on a time domain. A CP 504e of the OFDM symbol 502 exists in front of the four sample groups 504a, 504b, 504c, and 504d.

As an embodiment, the OFDM symbol 502 may be generated by repeating the same sequence R times on a time domain.

As an embodiment, the OFDM symbol 502 may be generated by arranging a reference signal sequence with spacing of R subcarriers on a frequency domain and performing an N-point FFT. In a shown example, N=2048. A frequency domain signal 506 of the OFDM symbol 502 consists of four sub-symbols 506a, 506b, 506c, and 506d, and each of the four sub-symbols 506a, 506b, 506c, and 506d consists of 512 subcarriers with subcarrier spacing of 300 kHz. A CP is added to an OFDM symbol signal including a reference signal which is generated through an FFT and the OFDM symbol signal to which the CP is added is transmitted through transmission beams of a base station. For example, the OFDM symbol signal may be transmitted through all transmission beams of a base station or at least one transmission beam.

In a case that a repetition of R=4 times is applied, modulation symbols to which a reference signal sequence is mapped on a frequency domain in an embodiment of the present disclosure may be defined as Equation (1).

$$\begin{cases} a_{k,l}^{(p)} = 0, \text{ if } k \bmod 4 \neq 0 \\ a_{k,l}^{(p)} = r_{l,n_s}(m), \text{ if } k \bmod 4 = 0 \end{cases} \quad \text{Equation 1}$$

$$m = 0, 1, \ldots, N_{RB}^{DL} \cdot N_{sc}^{RB}/4 - 1$$

According to an embodiment of the present disclosure, the reference signal sequence may be defined as the following Equation (2).

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{Equation 2}$$

$$m = 0, 1, \ldots, N_{RB}^{DL} - 1$$

$$c_{init} = 2^{10} \cdot (7 \cdot (n_s + 1) + l + 1) \cdot (2 \cdot N_{ID}^{cell} + 1) + 2 \cdot N_{ID}^{cell} + 1$$

where, k and l denote indexes on a frequency domain and indexes on a time domain, respectively, p and $n_s$ denote an antenna port number and a slot number, respectively, $N_{ID}^{cell}$ and $N_{RB}^{DL}$ denote a cell ID and a number of downlink resource blocks (RBs), $r_{l,n_s}(m)$ is the mth reference signal sequence, and $a_{k,l}^{(p)}$ denotes a modulation symbol which is carried through a kth subcarrier. As an embodiment, a base station may transmit a frequency domain signal including a reference signal sequence using transmission power which is greater four times than a frequency domain signal within a general OFDM symbol.

A terminal receives a reference signal transmitted from a base station while transitioning reception beams of the terminal during one symbol duration (i.e., 13.3 us) allocated for a BRS/BRRS, and obtains frequency response signals for four sub-symbols 506a, 506b, 506c, and 506d by repetitively performing an N/R-FFT on a received signal R times. In a shown example, a signal which corresponds to one OFDM symbol which a terminal receives during 13.3 us consists of 2048 samples, and the terminal may perform a 512-point FFT four times per every 612 samples.

In detail, a terminal receives a signal using the first reception beam during the first duration of 3.3 us (hereinafter, it will be referred to as sub-symbol duration) after a CP within a symbol duration which is allocated for a BRS/BRRS, receives a signal using the second reception beam during the second duration of 3.3 us, receives a signal using the third reception beam during the third duration of 3.3 us, and receives a signal using the fourth reception beam during the last duration of 3.3 us. Thereafter, a 512-point FFT is performed on a received signal of the first sub-symbol duration and channel information for the first reception beam is output. Next, a 512-point FFT is performed on a received signal of the second sub-symbol duration and channel information for the second reception beam is output, a 512-point FFT is performed on a received signal of the third sub-symbol duration and channel information for the third reception beam is output, and a 512-point FFT is performed on a received signal of the last sub-symbol duration and channel information for the last reception beam is output. Each channel information is used for evaluating channel quality for a corresponding reception beam.

A terminal may receive OFDM symbols which are necessary for evaluating necessary reception beams, e.g., all reception beams of the terminal, evaluate channel quality of the reception beams of the terminal, and select a preferred reception beam(s) for a communication with a current serving base station based on the channel quality.

Upon hardware implementation of a terminal, four 512-FFT processes for receiving a reference signal may be performed using a 2048-point FFT circuit used for receiving other signal (for example, a control signal or a data signal). That is, the terminal may operate by repeating a sub-block which corresponds to 512-point of the 2048-point FFT circuit four times upon receiving an OFDM symbol including the reference signal. Like this, a terminal may obtain four sub-symbols which are separated on a time domain during one OFDM symbol duration, i.e., 13.3 us and individual channel information for the four sub-symbols.

Figure 6:
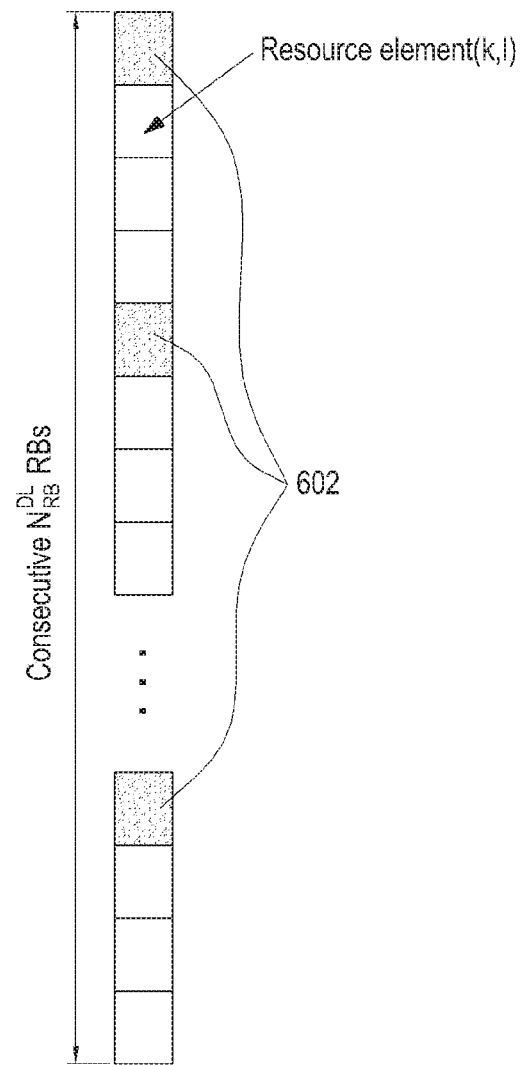
FIG. 6 is for describing an example of resource mapping of a reference signal according to an embodiment of the present disclosure.

FIG. 6 is for describing an example of resource mapping of a reference signal according to an embodiment of the present disclosure. Here, resource elements 602 used for transmitting a reference signal in each OFDM symbol on each antenna port is illustrated.

Referring to FIG. 6, a reference signal sequence which may be used for beam refinement is transmitted within all OFDM symbols, or at least one or at least two OFDM symbols within a downlink subframe which is indicated by associated downlink control information (DCI). The reference signal sequence which constitutes a reference signal is defined according to a slot number within a radio frame and an OFDM symbol number within a slot. The reference signal sequence may be mapped to a modulation symbol which corresponds to each Rth resource element 602. According to this, the reference signal has a signal pattern which is repeated with R-subcarrier spacing on a frequency domain.

As an embodiment, a subframe, a slot, and/or a symbol including the reference signal may be notified to a terminal through control information of a base station. As an embodiment, the base station may transmit information indicating a specific duration, e.g., a subframe, a slot, and/or a symbol through which the reference signal may be transmitted through at least one of radio resource control (RRC), a PDCCH, and a system information block (SIB).

Figure 7:
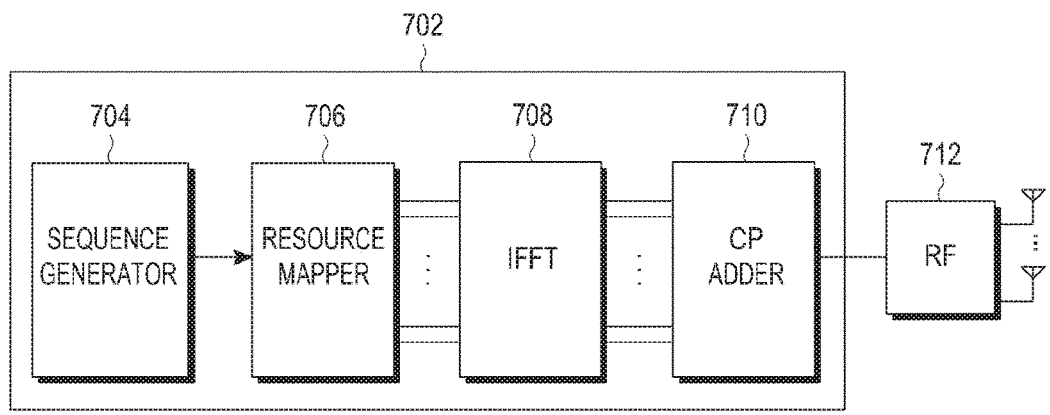
FIG. 7 illustrates a transmitter structure of a base station transmitting a reference signal according to an embodiment of the present disclosure.

FIG. 7 illustrates a transmitter structure of a base station transmitting a reference signal according to an embodiment of the present disclosure.

Referring to FIG. 7, a base band transmitter 702 includes a sequence generator 404, a resource mapper 706, an inverse fast fourier transform (IFFT) 708, and a CP adder 710, and is connected to an RF transmitting unit 712.

The sequence generator 404 generates a reference signal sequence according to a slot number within a radio frame, and an OFDM symbol number within a slot. The resource mapper 706 may map the reference signal sequence to modulation symbols which correspond to resource elements with four subcarrier-spacing according to a predefined repetition count, e.g., R=4. The IFFT 708 performs an IFFT on a signal including modulation symbols input by the resource mapper 706, and the CP adder 710 generates adds a CP to an output of the IFFT 708 to generate an OFDM symbol signal. The OFDM symbol signal may be input to the RF transmitting unit 712 through a digital to analog converter (not shown). The RF transmitting unit 712 includes at least one transmission array antenna, and transmits an input signal through all transmission beams of a base station or at least one pre-designated transmission beam.

Figure 8:
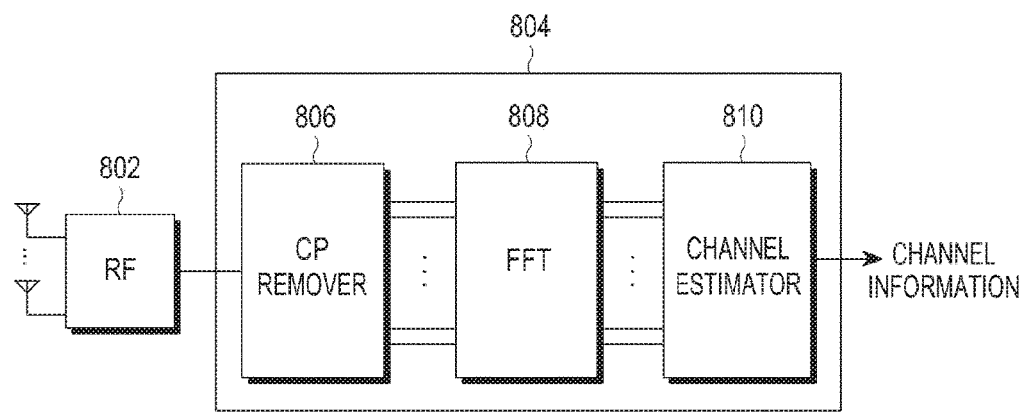
FIG. 8 illustrates a receiver structure of a terminal receiving a reference signal according to an embodiment of the present disclosure.

FIG. 8 illustrates a receiver structure of a terminal receiving a reference signal according to an embodiment of the present disclosure.

Referring to FIG. 8, an RF receiving unit 802 includes at least one reception array antenna, and receives a signal from a base station while transitioning a reception beam per pre-designated sub-symbol duration (e.g., a 512-sample duration) during an OFDM symbol duration within a downlink subframe which is designated for including a reference signal for beam refinement. The received signal is transferred to a base band receiver 804 through an analog to digital converter (not shown).

The base band receiver 804 includes a CP remover 806, an FFT 808, and a channel estimator 810.

The CP remover 806 removes a CP duration from the received signal, and inputs a signal from which the CP duration is removed to the FFT 808. The FFT 808 may input the signal from the CP remover 806 through designated 512 input points from total 2048 input points. The FFT 808 performs an FFT operation on four sub-symbol durations of one OFDM symbols signal four times to receive reference signals for different receptions beams. The channel estimator 810 performs channel estimation on a received signal which corresponds to each FFT operation to generate channel information for each reception beam. The channel information is input to a controller (or a control processor)(not shown), and may be used for evaluating receptions beams and selecting a preferred reception beam.

Figures 9, 10:
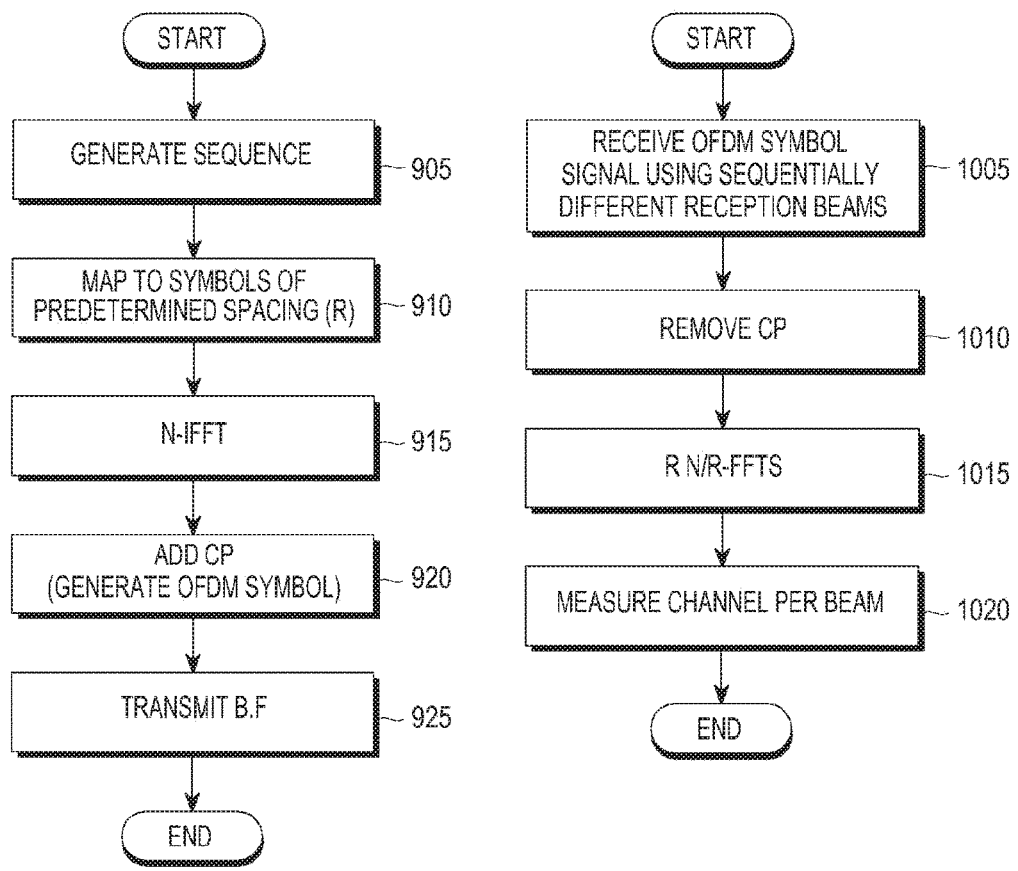
FIG. 9 is a flowchart illustrating an operation of a base station transmitting a reference signal according to an embodiment of the present disclosure.
FIG. 10 is a flowchart illustrating an operation of a terminal receiving a reference signal according to an embodiment of the present disclosure.

FIG. 9 is a flowchart illustrating an operation of a base station transmitting a reference signal according to an embodiment of the present disclosure.

Referring to FIG. 9, a base station generates a reference signal sequence according to a base station cell ID (or a value given by upper layer signalling transmitted by the base station), a slot number within a radio frame, and an OFDM symbol number within a slot at operation 905, maps the reference signal sequence to resource elements with four-subcarrier spacing according to a predefined repetition count, e.g., R=4 at operation 910, performs an IFFT on the mapped reference signal sequences at operation 915, and adds a CP to a signal generated through the IFFT to generate an OFDM symbol signal at operation 920. The base station transmits the OFDM symbol signal through all transmission beams of the base station or at least one pre-designated transmission beam at operation 925.

FIG. 10 is a flowchart illustrating an operation of a terminal receiving a reference signal according to an embodiment of the present disclosure.

Referring to FIG. 10, a terminal receives a signal from a base station while transitioning a reception beam per pre-designated sub-symbol duration (e.g., 512 sample-duration) during an OFDM symbol duration within a downlink subframe designated for beam refinement at operation 1005. The terminal removes a CP duration from the received signal at operation 1010, and performs an FFT operation on signals of four sub-symbol durations of the signal from which the CP is removed four times at operation 1015. The terminal performs channel estimation on a received signal obtained through the four FFTs to generate channel information for each reception beam at operation 1020. The channel information may be used for evaluating reception beams and selecting a preferred reception beam.

Figure 11:
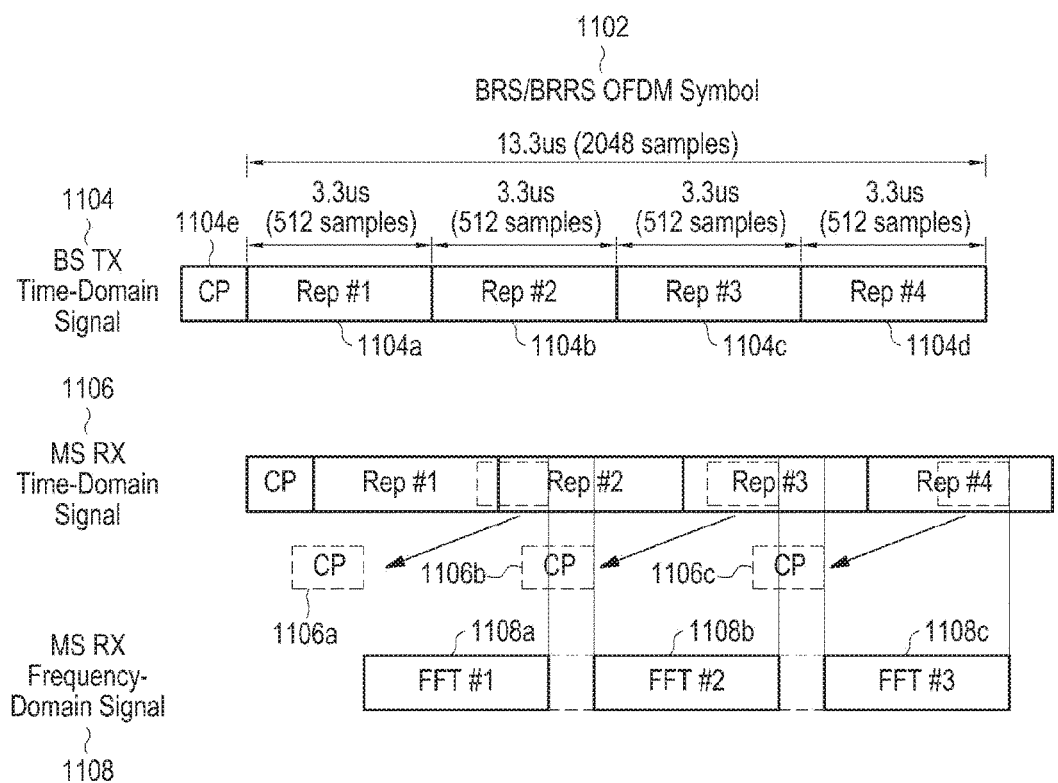
FIG. 11 illustrates a CP which may be obtained from a signal of a repeated pattern according to an embodiment of the present disclosure.

FIG. 11 illustrates a CP which may be obtained from a signal of a repeated pattern according to an embodiment of the present disclosure.

Referring to FIG. 11, a base station repetitively transmits the same patterns 1104a, 1104b, 1104c, and 1104d four times on four sub-symbol durations within a time domain signal 1104 of an OFDM symbol 1102. In the first duration of the OFDM symbol 1102, a CP 1104e is transmitted. Reference signs 1106 and 1108 indicate a received reference signal of a terminal on a time domain and a received reference signal of the terminal on a frequency domain.

Even though the terminal performs an FFT (i.e., an FFT #1 1108a, an FFT #2 1108b, and an FFT #3 1108c) on 512 samples (i.e., a sub-symbol) randomly selected from among 2048 samples of the OFDM symbol 1102, a signal 1106a, 1106b, and 1106c which is immediately before each sub-symbol acts as a CP, so occurrence of Inter-Symbol Interference (ISI) due to a channel delay tap may be completely prevented. The terminal may compensate for phase difference for symbols of each sub-symbol by performing phase correction on a signal obtained through each FFT 1108a, 1108b, and 1108c.

So, the terminal may also perform simple channel equalization on a 512-point signal like in an existing OFDM receiver, so advantage which an OFDM system has maintains as it is. The terminal does not need to obtain an additional CP duration whenever receiving each sub-symbol of a reference signal, very efficient configuration becomes possible in an aspect of a specification.

According to this, the terminal may randomly select an FFT window to be used for transitioning to a frequency domain signal 1108 on a time domain signal 1106 according to a situation of the terminal. An original repetitive pattern signal has an effect which is cyclic shifted on a time domain according to a location of the FFT window determined by the terminal, so this results in a linear phase shift effect on a frequency domain. The terminal may know how much the repetitive pattern signal selected by the terminal has been cyclic shifted on the time domain according to the location of the FFT window, so the terminal may calculate linear phase shift on the frequency domain and obtain original channel information by compensating for the linear phase shift.

Figure 12:
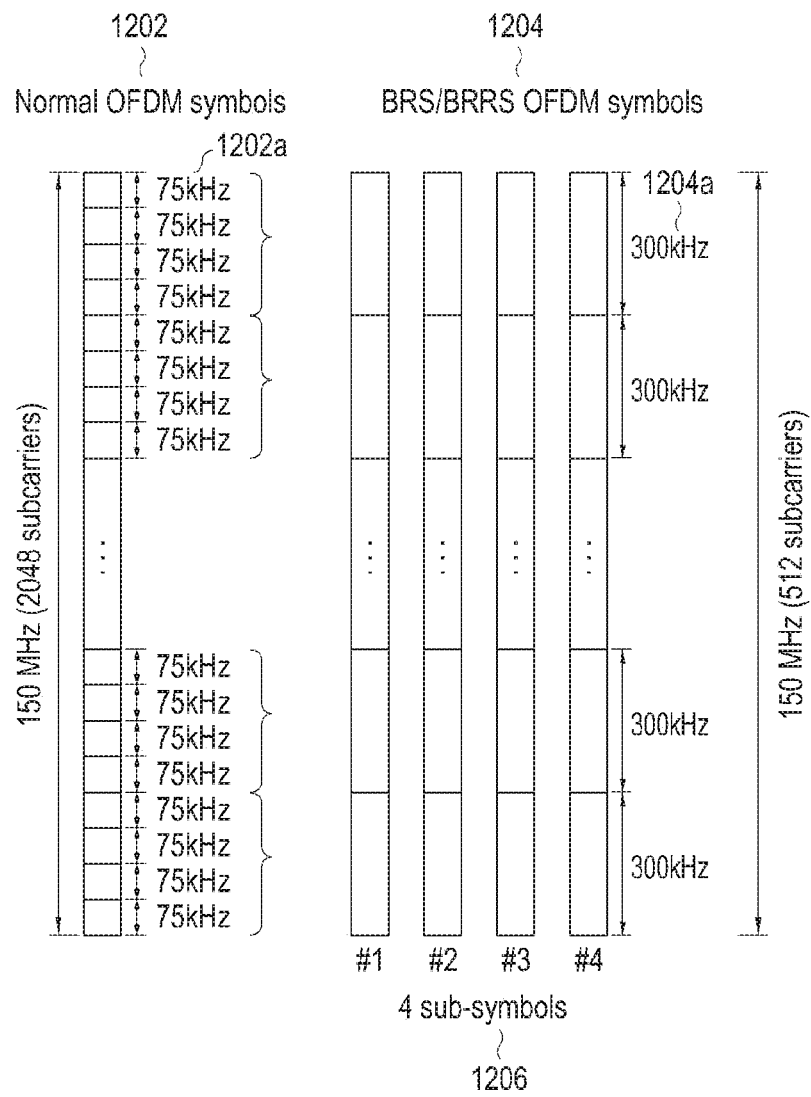
FIG. 12 illustrates a comparison of an OFDM symbol including a reference signal according to an embodiment of the present disclosure and a general OFDM symbol on a frequency domain.

FIG. 12 illustrates a comparison of an OFDM symbol including a reference signal according to an embodiment of the present disclosure and a general OFDM symbol on a frequency domain.

Referring to FIG. 12, one subcarrier has a 75 kHz bandwidth (i.e., a subcarrier duration) 1202a in a general OFDM symbol 1202 which does not include a reference signal, however, one subcarrier has a 300 kHz bandwidth 1204a in an OFDM symbol 1204 including a reference signal. Finally, the one subcarrier of the OFDM symbol 1204 including the reference signal corresponds to four subcarriers of the OFDM symbol 1202, so channel information which is obtained for one subcarrier may be regarded as a representative value which is obtained by averaging channel information for four subcarriers at the same location in the OFDM symbol 1204 including the reference signal.

In embodiments of the present disclosure as described above, a plurality of opportunities of a beam search may be provided to a terminal by repeating the same pattern on a time domain instead of decreasing accuracy of a frequency region within the same time duration.

Figure 13:
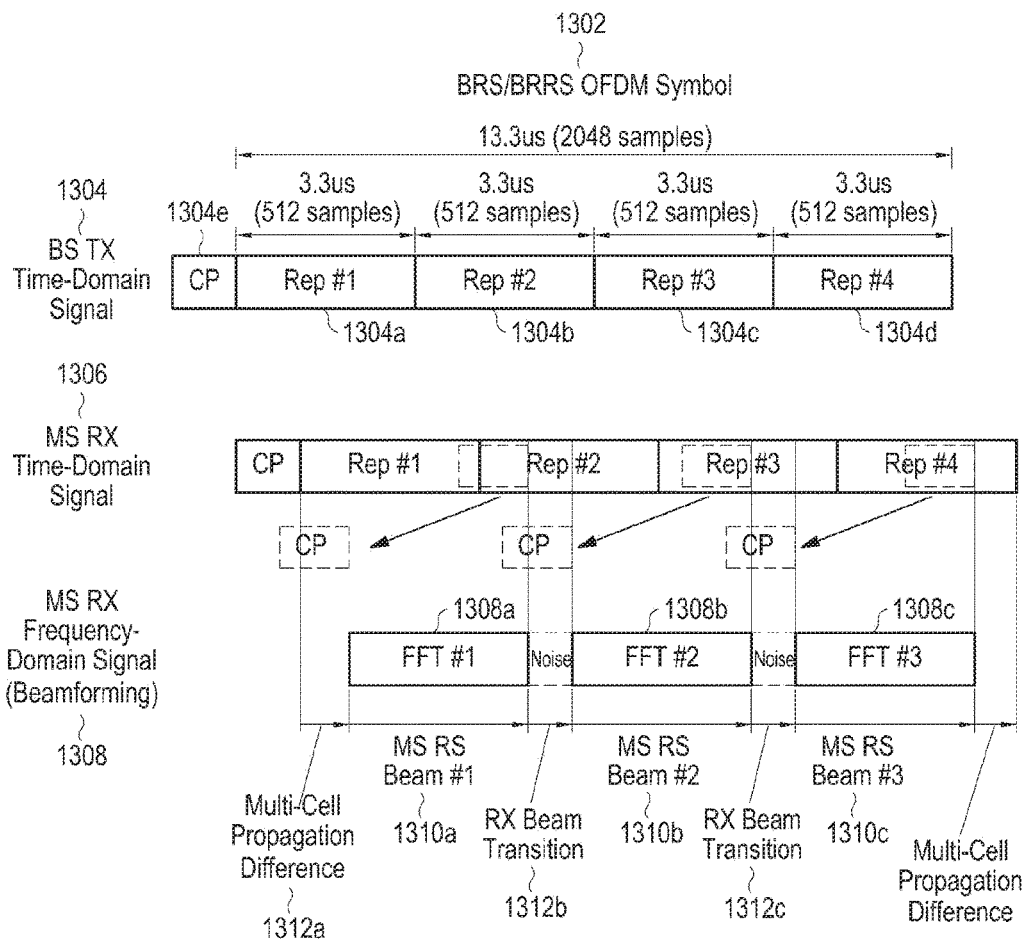
FIG. 13 is for describing reception beam transition scheme in an OFDM symbol signal including a reference signal according to an embodiment of the present disclosure.

FIG. 13 is for describing a reception beam transition scheme in an OFDM symbol signal including a reference signal according to an embodiment of the present disclosure.

Referring to FIG. 13, a base station repetitively transmits the same patterns 1304a, 1304b, 1304c, and 1304d four times on four sub-symbol durations within a time domain signal 1304 of an OFDM symbol 1302. In the first duration of the OFDM symbol 1302, a CP 1304e is transmitted. The base station may transmit repetitive patterns 1304a, 1304b, 1304c, and 1304d using the same transmission beam. Reference signs 1306 and 1308 indicate a received reference signal of a terminal on a time domain and a received reference signal of the terminal on a frequency domain.

The terminal receives first 512 samples 1308a using an MS reception beam #1 1310a after a duration 1312a which corresponds to multi-cell propagation difference after a CP duration which corresponds to the CP 1304e of the OFDM symbol 1302. After reception beam transition 1312b, the second 512 samples 1308b are received using an MS reception beam #2 1310b. After reception beam transition 1312c, the third 512 samples 1308c are received using an MS reception beam #3 1310c. Each 512 samples 1308a, 1308b, and 1308c are passed through a 512-point FFT.

As described above, in a signal duration of a repetitive pattern, a base station performs transmission while fixing a transmission beam, a terminal performs reception while sweeping receptions beams, so a beam search is performed. The terminal changes physical configuration such as a beam weight and gains of an RF unit during reception beam transition 1312b and 1312c, so a signal during the reception beam transition 1312b and 1312c may not be used for an FFT due to noise which occurs due to the change of the physical configuration. Length of time required for the reception beam transition 1312b and 1312c is obtained according to a receiver chip characteristic of the terminal.

The terminal as described above may locate an FFT window at a random location of an OFDM symbol duration including a reference signal, so the terminal waits for beam transition time required for reception beam transition and locates the FFT window to the next 512 samples. The terminal configured to operate as in embodiment in FIG. 13 may measure channel information for three reception beams. As another embodiment, if beam transition time is negligible, the terminal may perform measurement four times.

As described above, in embodiments of the present disclosure, more beam measurement is possible within the same time by transitioning reception beams of a terminal instead of transitioning transmission beams of a base station. If a base station performs beam sweep while transitioning transmission beams, the base station needs to wait for sufficient time which corresponds to channel propagation delay and delay spread whenever transitioning a beam such that additional interference among transmission beams does not occur in time except for beam transition time. However, if reception beams of the terminal are transitioned while transmission beams of the base station are fixed, the terminal may perform a beam search while waiting for beam transition time which occurs when transitioning reception beams without considering an effect of interference due to channel propagation delay and delay spread per transmission beam. Generally, beam transition time is very short compared to channel propagation delay and delay spread, so more beams may be measured within the same time by transitioning reception beams.

Figure 14:
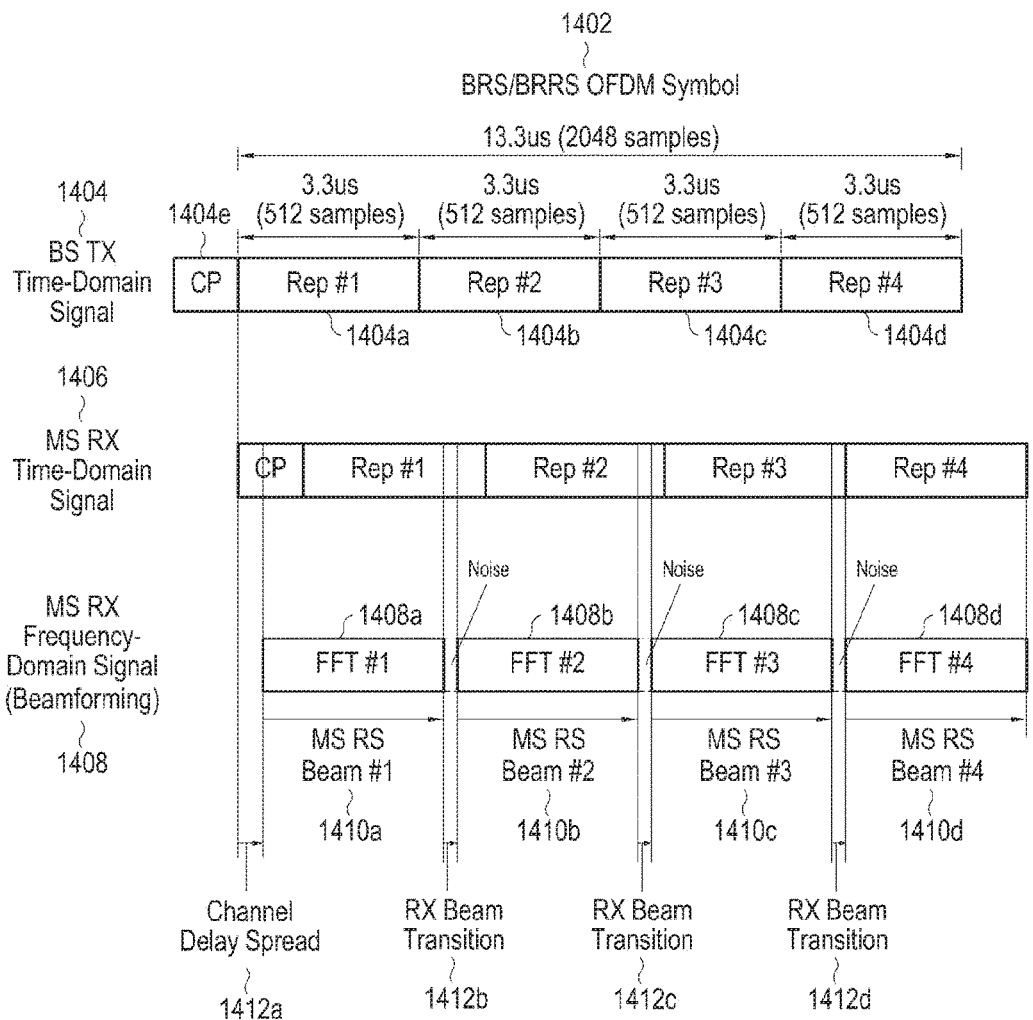
FIG. 14 is for describing a scheme of increasing the number of beam measurement using a part of a CP duration according to an embodiment of the present disclosure.

FIG. 14 is for describing a scheme of increasing the number of beam measurement using a part of a CP duration according to an embodiment of the present disclosure.

Referring to FIG. 14, a base station repetitively transmits the same patterns 1404a, 1404b, 1404c, and 1404d four times on four sub-symbol durations within a time domain signal 1404 of an OFDM symbol 1402. In the first duration of the OFDM symbol 1402, a CP 1404e is transmitted. The base station may transmit repetitive patterns 1404a, 1404b, 1404c, and 1404d using the same transmission beam. Reference signs 1406 and 1408 indicate a received reference signal of a terminal on a time domain and a received reference signal of the terminal on a frequency domain.

The terminal receives first 512 samples 1408a using an MS reception beam #1 1410a after a duration 1412a which corresponds to channel delay spread of the OFDM symbol 1402. After reception beam transition 1412b, the second 512 samples 1408b are received using an MS reception beam #2 1410b. After reception beam transition 1412c, the third 512 samples 1408c are received using an MS reception beam #3 1410c. After reception beam transition 1412d, the fourth 512 samples 1408d are received using an MS reception beam #4 1410d. Each 512 samples 1408a, 1408b, 1408c, and 1408d are passed through a 512-point FFT.

The channel delay spread may be predicted through channel measurement. According to a shown embodiment, if channel delay spread which is predicted for a current channel is sufficiently short, that is, if the predicted channel delay spread is less than a predetermined reference value, the terminal may compensate for samples which are wasted due to beam transition by inputting some samples after the CP duration 1404e to an FFT and perform a search for total four beams. As an embodiment, if three beam transition time is shorter than time which is generated by subtracting predicted channel delay spread from a CP duration, the terminal may determine to perform four beam measurements using samples (including some samples of the CP duration) after samples which correspond to the channel delay spread from start of an OFDM symbol duration.

Figure 15:
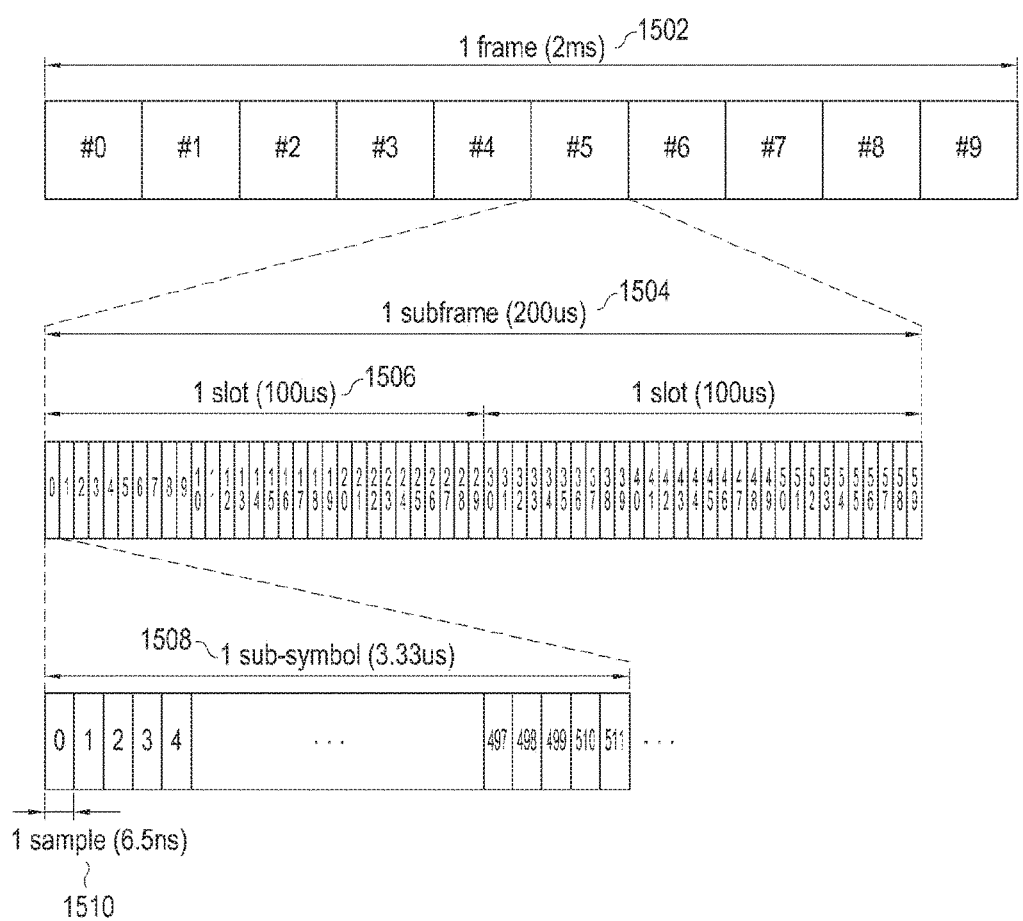
FIG. 15 schematically illustrates an example of a special subframe which may be used for a beam search according an embodiment of the present disclosure.

FIG. 15 schematically illustrates an example of a special subframe which may be used for a beam search according an embodiment of the present disclosure. Here, a reference signal is repetitively arranged in a structure which does not have a CP duration for maximizing beam search efficiency within the special subframe.

Referring to FIG. 15, one frame 1502 has length of 2 ms, and may include 10 subframes. One subframe 1504 has length of 200 us and may consist of two slots. One slot 1506 has length of 100 us, and may include 30 sub-symbols without a CP duration. One sub-symbols 1508 has length of 3.33 us, and may include 512 samples. Length of each sample 1510 is 6.5 ns. 512 samples are repeated without a CP duration within 60 sub-symbols which constitute a special subframe which is designated to include a reference signal which may be used for a beam search.

A shown special subframe 1504 does not have overhead of a CP, so the maximum number of beam searches may be allowed within one subframe duration. The special subframe 1504 does not have a structure which have 12 subcarriers and a CP like as other subframes, so the special subframe 1504 has no coherence with other subframe, and it is impossible to transmit control information such as a Physical Downlink Control Channel (PDCCH) or a Physical Uplink Control Channel (PUCCH) through the special subframe 1504.

Figure 16:
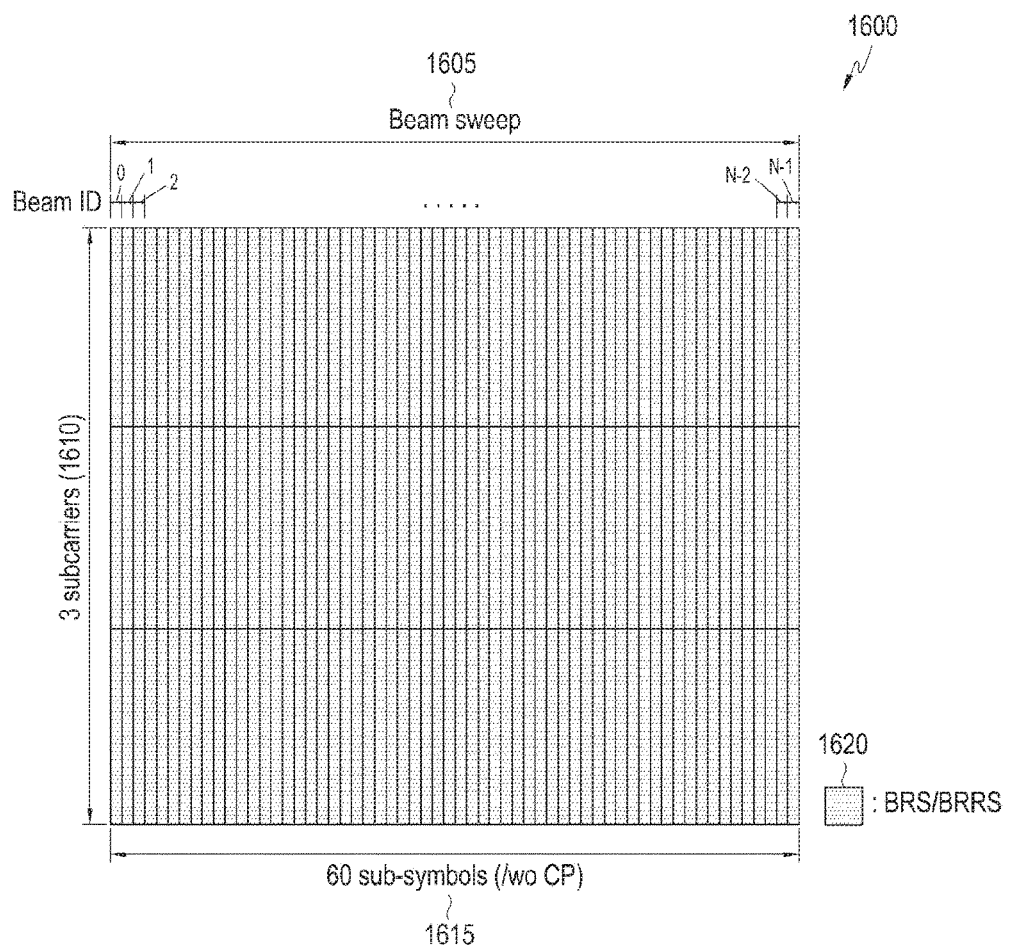
FIG. 16 illustrates a resource block structure in a special subframe which may be used for a beam search according to an embodiment of the present disclosure.

FIG. 16 illustrates a resource block structure in a special subframe which may be used for a beam search according to an embodiment of the present disclosure.

Referring to FIG. 16, a special subframe 1600 which is designated to include a reference signal which may be used for a beam search includes three subcarriers 1610 on a frequency domain and includes 60 sub-symbols without a CP on a time domain. A sequence pattern 1620 of a reference signal which consists of 512 samples is repetitively transmitted 60 times within the special subframe 1600.

As an embodiment, a base station fixes a transmission beam during the special subframe 1600, and a terminal may receive the reference signal through N beams while performing reception beam sweep 1605 during the special subframe 1600.

As an embodiment, the base station transitions and applies a predetermined number of transmission beams during the special subframe 1600. For example, the base station may transition a transmission beam per 3 to 30 sub-symbols. Similarly, the terminal may receive the reference signal through the N beams while performing the reception beam sweep during the special subframe 1600. At this time, there is a need for a some timing margin on a time domain in a duration during which a transmission beam is transitioned, so some overhead may occur whenever the base station transitions the transmission beam.

Figure 17:
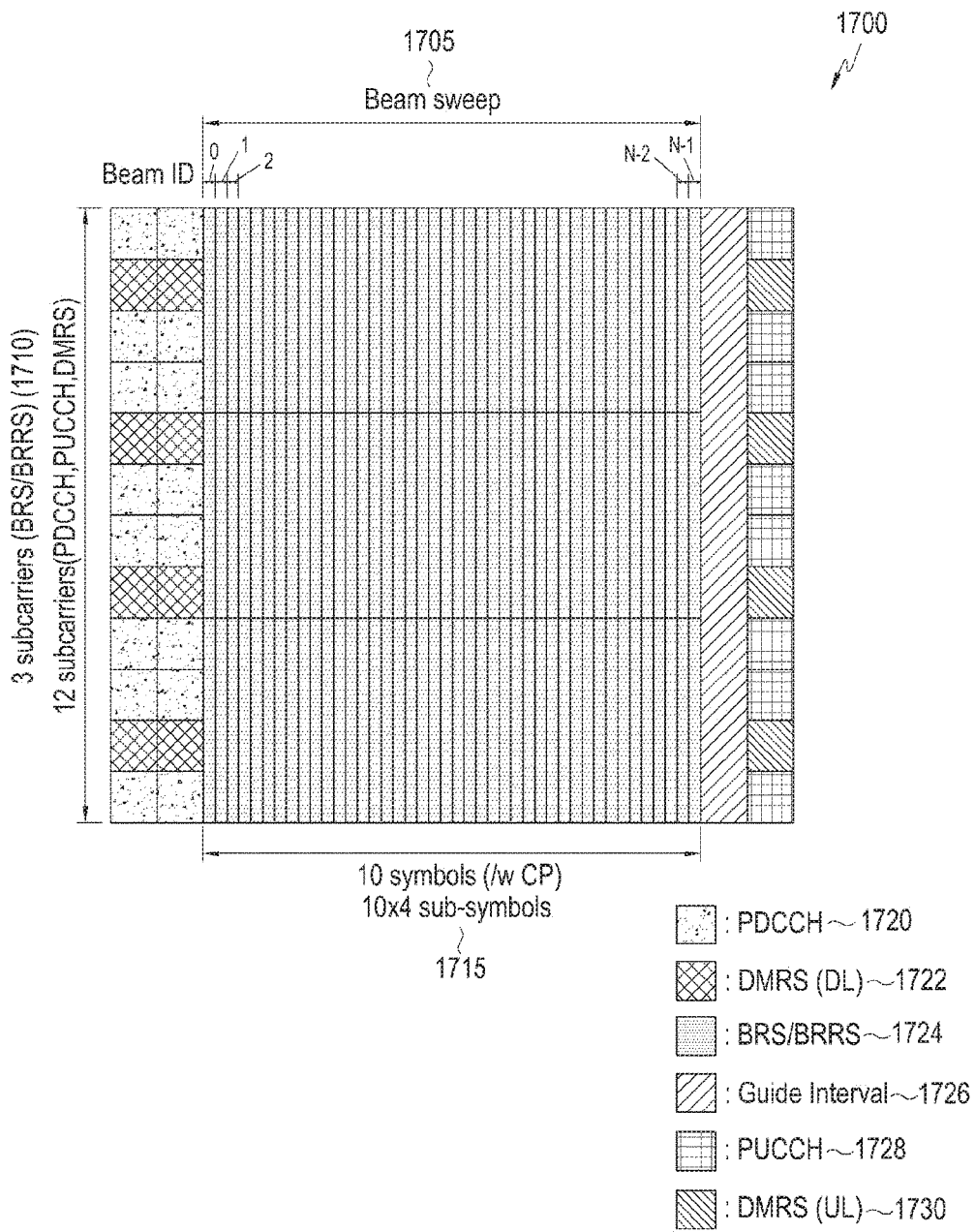
FIG. 17 illustrates a structure of a resource block including a control channel in a subframe which may be used for a beam search according to an embodiment of the present disclosure.

FIG. 17 illustrates a structure of a resource block including a control channel in a subframe which may be used for a beam search according to an embodiment of the present disclosure.

Referring to FIG. 17, a subframe 1700 consists of 14 OFDM symbols including a CP in order to maintain an existing structure. During the first two symbols within the subframe 1700, a PDCCH 1720 and a DL DMRS 1722 may be transmitted. During the next ten symbols 1715, for example, a reference signal which consists of four sub-symbols as shown in FIG. 5 is transmitted ten times per symbol duration, so total 40 reference signals are transmitted. The last symbol after one symbol used for a guide interval (GI) 1726 may be used for transmitting a PUCCH 1728 and a UL DMRS 1730. This subframe structure may be varied such as increase of the number of reference signals, decrease of the number of reference signals, and/or the like according to a situation.

Similar to FIG. 16, a base station may fix a transmission beam or perform transmission beam sweep during a duration during which a reference signal of the subframe 1700 is transmitted. A terminal may receive the reference signal through N beams while performing reception beam sweep 1705 during the duration during which the reference signal of the subframe 1700 is transmitted. Like this, the subframe 1700 has a total structure which is similar to a general subframe of a 14-symbol structure including a CP, and may have four repetitive patterns within an inner useful symbol duration 1715. The shown subframe structure may be also used for carrying a reference signal if there is a need for transmission of a PDCCH or a PUCCH. The number and/or a location of symbols which may be allocated as the symbol duration 1715 during which the reference signal is transmitted may be predetermined or may be configured by upper layer signaling from the base station.

Figure 18:
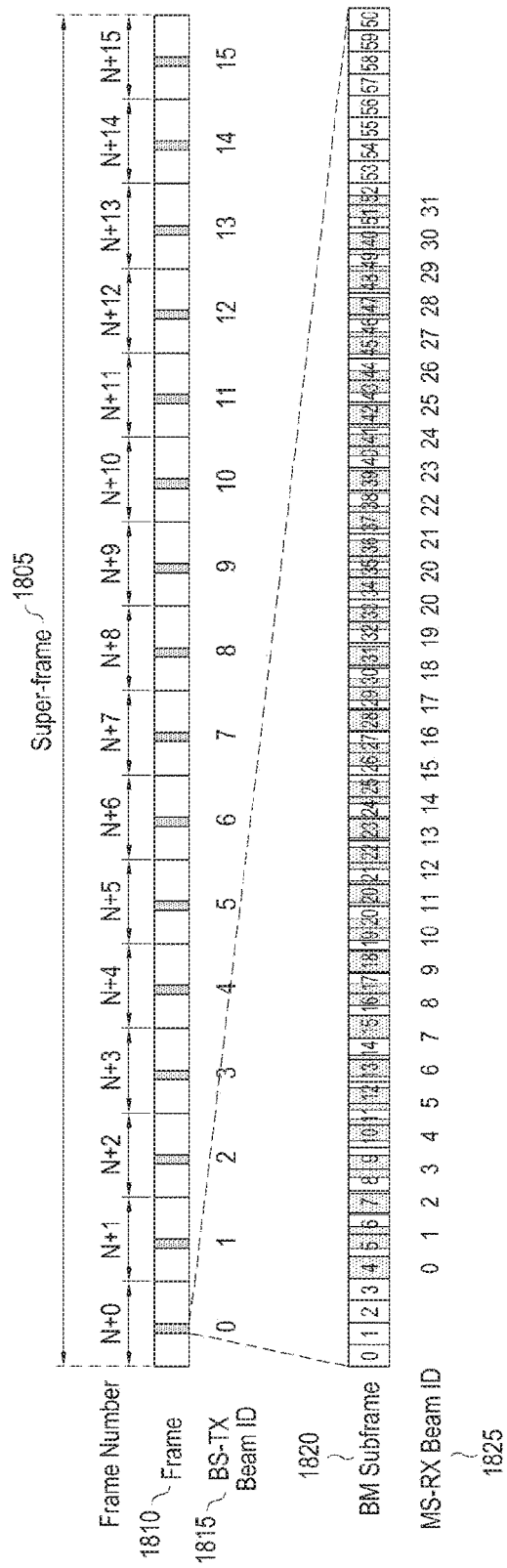
FIG. 18 is a figure for describing beam sweep in a special subframe which may be used for a beam search according to an embodiment of the present disclosure.

FIG. 18 is a figure for describing beam sweep in a special subframe which may be used for a beam search according to an embodiment of the present disclosure.

Referring to FIG. 18, a base station uses up to 16 transmission beams 1815, a terminal uses up to 32 transmission beams 1825, and one special subframe 1820 for a reference signal is designated within one frame 1810. During the special subframe 1820, the terminal may search all reception beams 1825. For fully searching beam combinations (e.g., beam pairs) with all transmission beams 1815 of the base station, the terminal needs to receive reference signals through 16 frames in order to obtain channel information for 16×32 beam combinations. So, a period required for the terminal to search all transmission beams is set to 16 frames 1805, and the terminal may complete a beam search for all beam combinations during the period.

In a case that the terminal moves at a high speed or a user rotates the terminal, it takes longer time to search a beam, so a sufficient beam search may not be performed during the period. So, if the base station has a plurality of transmission antennas, the base station needs to suitably design a transmission beam transmitting scenario for decreasing beam search time of the terminal.

Generally, a distance among multiple antennas of a base station is very close compared to a distance between the base station and a terminal, signals which different adjacent antennas transmit towards the same transmission beam direction are received at the terminal with almost same signal strength. In a single input single output (SISO) case, selection of a transmission beam is performed based on a signal-to-noise ratio (SNR) of a received signal, the terminal simply selects a direction of a transmission beam with the strongest strength. This means that there is no need for identifying a transmission beam per transmission antenna in the SISO case.

In a multiple input multiple output (MIMO) case, a terminal needs to measure channel capacity in which a phase is considered for all transmission beams per transmission antenna of a base station in order to select a best beam combination. That is, channel capacities among transmission antennas have difference due to phase difference among the transmission antennas in spite of the same transmission beam direction, so the terminal needs to fully search all transmission beams per each transmission antenna.

Figure 19:
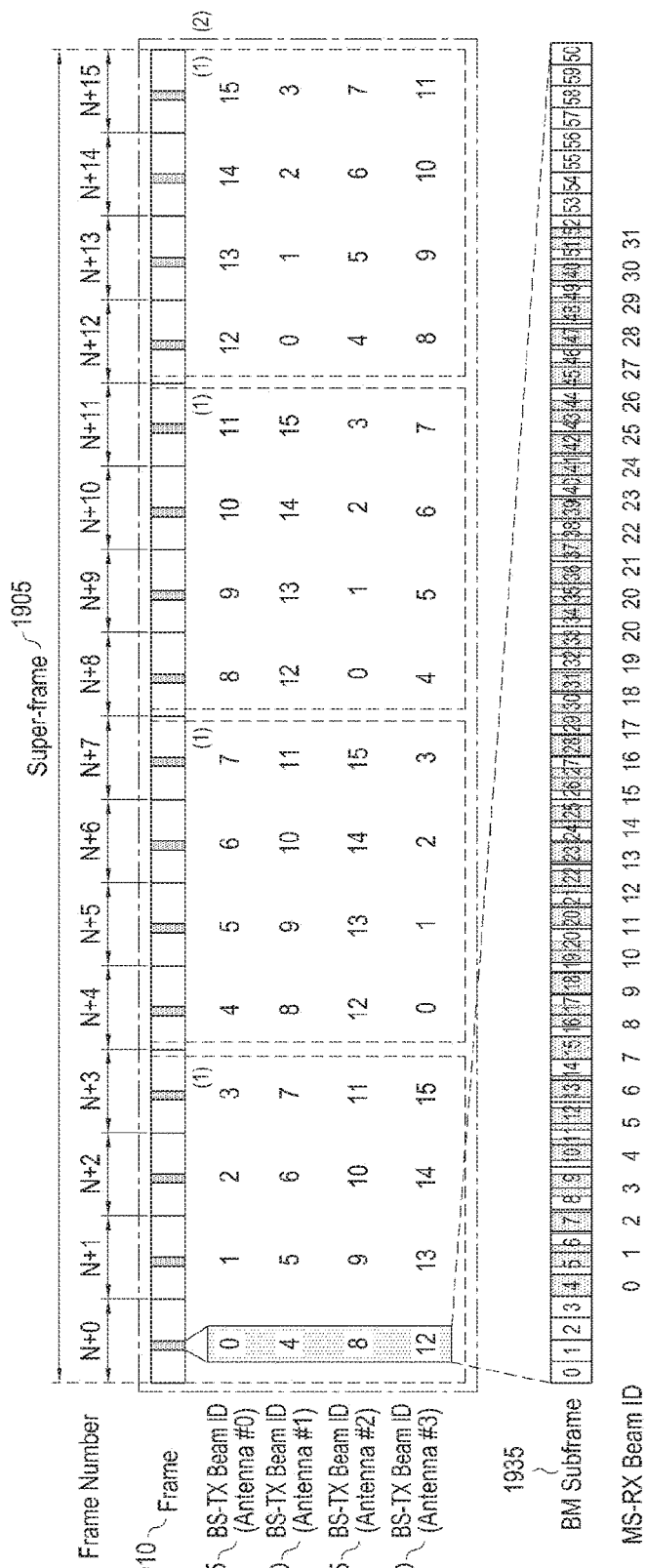
FIG. 19 is a figure for describing a transmission beam transmitting scenario of a base station which uses an adaptive beam search period according to an embodiment of the present disclosure.

FIG. 19 is a figure for describing a transmission beam transmitting scenario of a base station which uses an adaptive beam search period according to an embodiment of the present disclosure.

Referring to FIG. 19, a base station has four transmission antennas, and may use up to 16 transmission antennas. A period required for a terminal to search all transmission beams of the base station is 16 frames 1910, and the 16 frames 1610 are shown as a superframe 1905. The base station divides the 16 frames within the superframe 1905 into four frame groups which corresponds to the number of transmission antennas of the base station, and configures a transmission beam sequence such that all of 16 transmission beams are allocated within each frame group.

In detail, a transmission antenna #0 1915 of the base station sequentially transmits a signal including a reference signal sequence through transmission beams #0, #1, #2, and

3 on a frame basis during the first four frames of the superframe 1905, sequentially transmits the signal including the reference signal sequence through transmission beams #4, #5, #6, and #7 during the next four frames, sequentially transmits the signal including the reference signal sequence through transmission beams #8, #9, #10, and #11 during the next four frames, and sequentially transmits the signal including the reference signal sequence through transmission beams #12, #13, #14, and #15 during the last four frames.

In detail, a transmission antenna #1 1920 of the base station sequentially transmits a signal including a reference signal sequence through transmission beams #4, #5, #6, and #7 on a frame basis during the first four frames of the superframe 1905, sequentially transmits the signal including the reference signal sequence through transmission beams #8, #9, #10, and #11 during the next four frames, sequentially transmits the signal including the reference signal sequence through transmission beams #12, #13, #14, and #15 during the next four frames, and sequentially transmits the signal including the reference signal sequence through transmission beams #0, #1, #2, and #3 during the last four frames.

Similarly, during each frame of the superframe 1905, transmission antennas #1 1925 and #2 1930 of the base station transmit a signal through a transmission beam different from the transmission antennas 1915 and 1920.

During a subframe 1935 designated for transmitting a reference signal within each frame, a terminal receives a signal from a base station while transitioning reception beams 1940 of the terminal. The terminal adaptively configures a beam search period of the terminal according to a transmission beam sequence of the base station, and may search beam combinations for all transmission beams by receiving a signal from the base station during 16 frames.

As an embodiment, if a terminal moves at a high speed, variance of a channel is large, so suitable MIMO transmission is difficult and generally considers only SISO transmission. In this case, there is a high probability that a best beam combination is rapidly changed, so the terminal needs to perform a beam search by a period as fast as possible. In a case of considering only SISO, only signal strength of a received signal is important, the terminal does not need to receive beams transmitted through only the same transmission antenna, and may obtain a measurement result same as the same transmission antenna even though measuring channel information for beams transmitted different adjacent transmission antennas.

So, in a case of SISO transmission, a terminal may perform a beam search without identifying transmission antennas within one frame group as shown in (1) in FIG. 19. The one frame group includes all transmission beams, so the terminal may perform a full search in a case of SISO. As a result, even though a beam search period is reduced to ¼, a stable communication is possible on movement. In the present disclosure, this operation will be defined as fast search mode.

As an embodiment, if a terminal moves at a low speed, MIMO transmission may be considered. In a case of the MIMO transmission, it is important for the terminal to measure channel capacity including phase information as well as signal strength of each beam. So, the terminal needs to obtain antenna diversity by considering transmission beams of the same beam direction which are transmitted through all transmission antennas for maximizing MIMO transmission possibility. So, in the case of the MIMO transmission, the terminal performs a beam search by receiving a signal for all transmission beams of all transmission antennas as shown in (2) in FIG. 19. In the present disclosure, this operation will be defined as full search mode.

Figure 20:
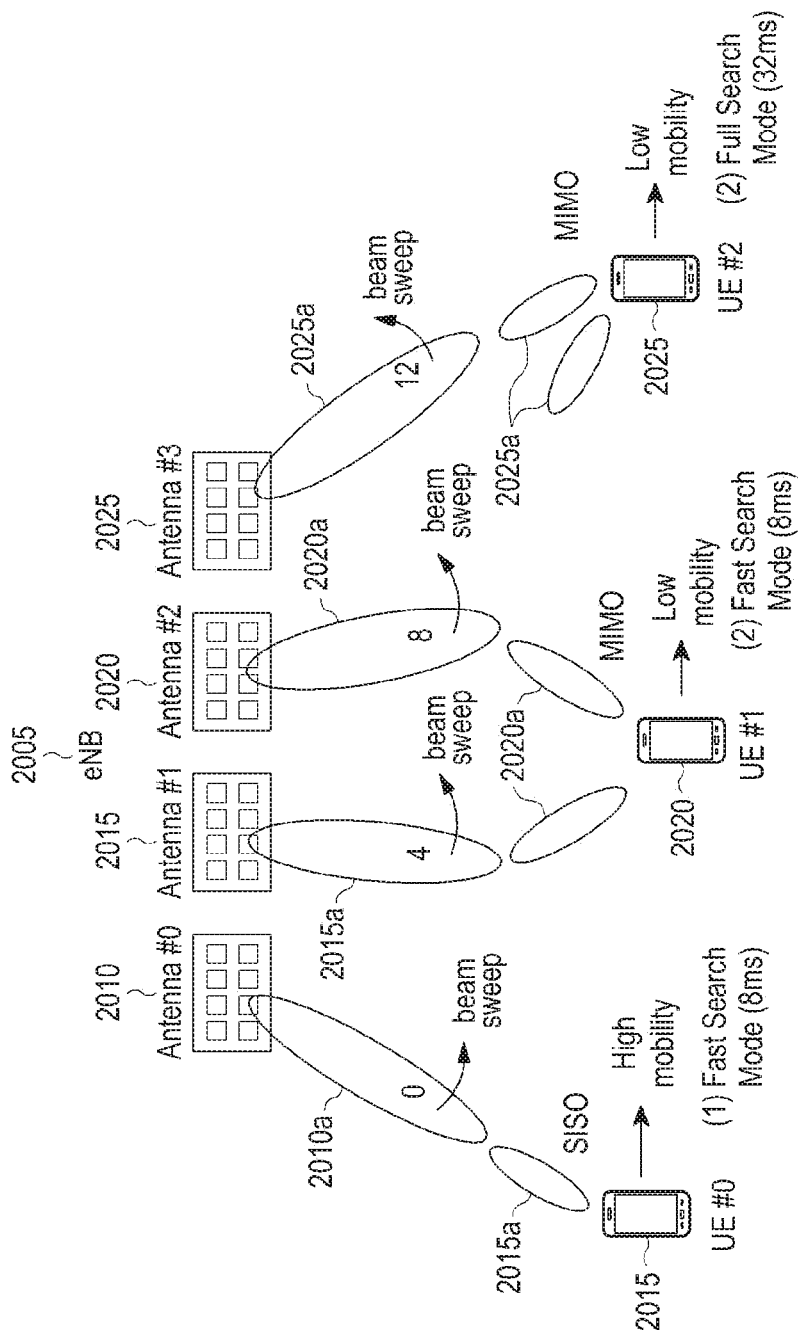
FIG. 20 is a figure for describing an adaptive beam search period of a terminal according to an embodiment of the present disclosure.

FIG. 20 is a figure for describing an adaptive beam search period of a terminal according to an embodiment of the present disclosure.

Referring to FIG. 20, a terminal #0 2015 determines to operate in a fast search mode upon performing SISO transmission while moving at a high speed. The terminal #0 2015 receives signals transmitted through all transmission beams from transmission antennas #0, #1, #2, and #3 2010, 2015, 2020, and 2025 of a base station 2005 using a reception beam 2015a of the terminal #0 2015 during 8 ms which corresponds to four frames, and measures channel information for all transmission/reception beam combinations based on the received signals.

A terminal #1 2020 and a terminal #2 2025 determine to operate in a full search mode upon performing MISO transmission while moving at a low speed. The terminal #1 2020 and the terminal #2 2025 receive signals transmitted through all transmission beams from the transmission antennas #0, #1, #2, and #3 2010, 2015, 2020, and 2025 of the base station 2005 using reception beams 2020a and 2025a of the terminal #1 2020 and the terminal #2 2025 during 16 ms which corresponds to 16 frames, and measures channel information for all transmission/reception beam combinations based on the received signals.

Like this, a method in which a base station and a terminal perform transmission at beam directions as different as possible may additionally obtain an effect that a dynamic range of a terminal receiver is decreased. This is why strong signals are summed and deviation of signal strength is large if transmission antennas transmit signals at the same direction, however, a case that a strong signal and a weak signal are input together frequency occurs and then deviation of signal strength is finally small if adjacent transmission antennas transmit signals at beam directions as scattered as possible like as an embodiment as described above.

Figure 21:
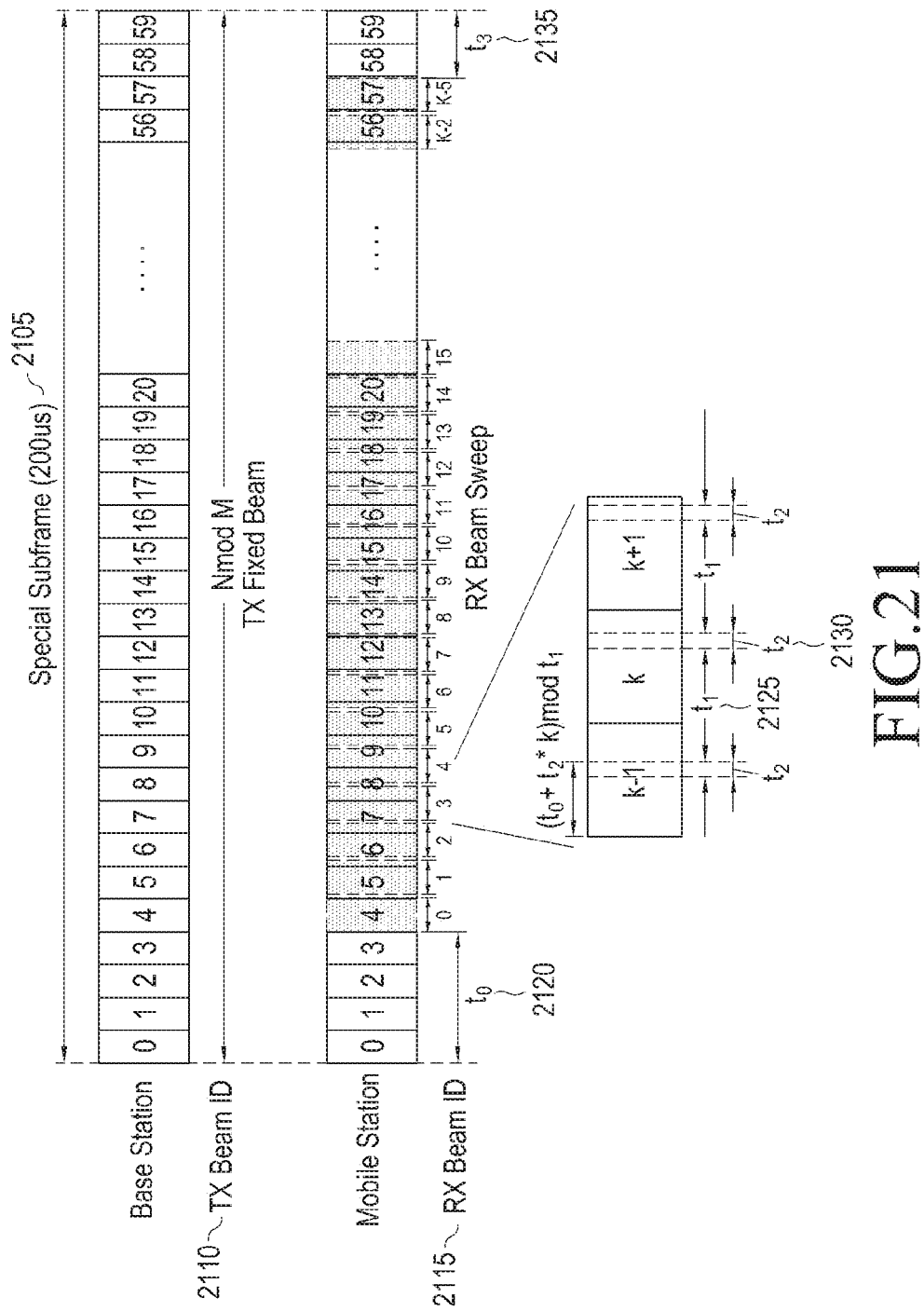
FIG. 21 illustrates a timing diagram for beam measurement of a terminal according to an embodiment of the present disclosure.

FIG. 21 illustrates a timing diagram for beam measurement of a terminal according to an embodiment of the present disclosure. A case that there are 60 repetitive patterns on a special subframe which is designated to include a reference signal is described in a shown example.

Referring to FIG. 21, a special subframe 2105 which is designated to include a reference signal consists of 60 sub-symbols, and a base station uses a fixed transmission beam 2110 during 60 sub-symbols.

A terminal does not perform beam measurement during the first to time 2120 of the special subframe 2105. The to time 2120 is a predetermined guard interval (GI) used for overcoming time difference among base station signals which occurs due to GPS synchronization difference and propagation delay difference among base stations. As an embodiment, the to time 2120 may be calculated as sum of a GPS offset of a base station and cell propagation delay difference.

The next $t_1$ time 2125 is a beam measurement symbol duration during which a terminal performs beam measurement on a frequency domain by performing an FFT on a received signal. The $t_1$ time 2125 may have, for example, length of 512 samples as ¼ of 2048 samples of an OFDM symbol according to allocation and arrangement of a reference signal sequence. The next $t_2$ time 2130 is a part which may not be used upon actual reception as beam transition time during which the terminal performs reception beam transition. As an embodiment, $t_2$ time 2130 may be calculated as sum of beam transition time and a timing margin which are determined according to a characteristic of an RF unit of the terminal. Thereafter, the terminal continuously performs beam measurement by continuously repeating $t_1$ and $t_2$ durations 2125 and 2130.

The last $t_3$ time 2135 is a predetermined guard interval which is used for preventing an interference problem which occurs if a signal of a neighbor base station is firstly received. As an embodiment, the $t_3$ time 2135 may be calculated as sum of a GPS offset of the base station and a handover threshold offset.

Table 1 shows examples of parameters required for a terminal to perform beam measurement according to an embodiment of the present disclosure.

TABLE 1

| Parameters | Description |
| --- | --- |
| $t_0$ | Pre-GI (BS GPS offset + Cell propagation delay difference) |
| $t_1$ | BM symbol period |
| $t_2$ | MS RF beam transition time + timing margin |
| $t_3$ | Post-GI (BS GPS offset + Handover threshold offset) |

Figure 22:
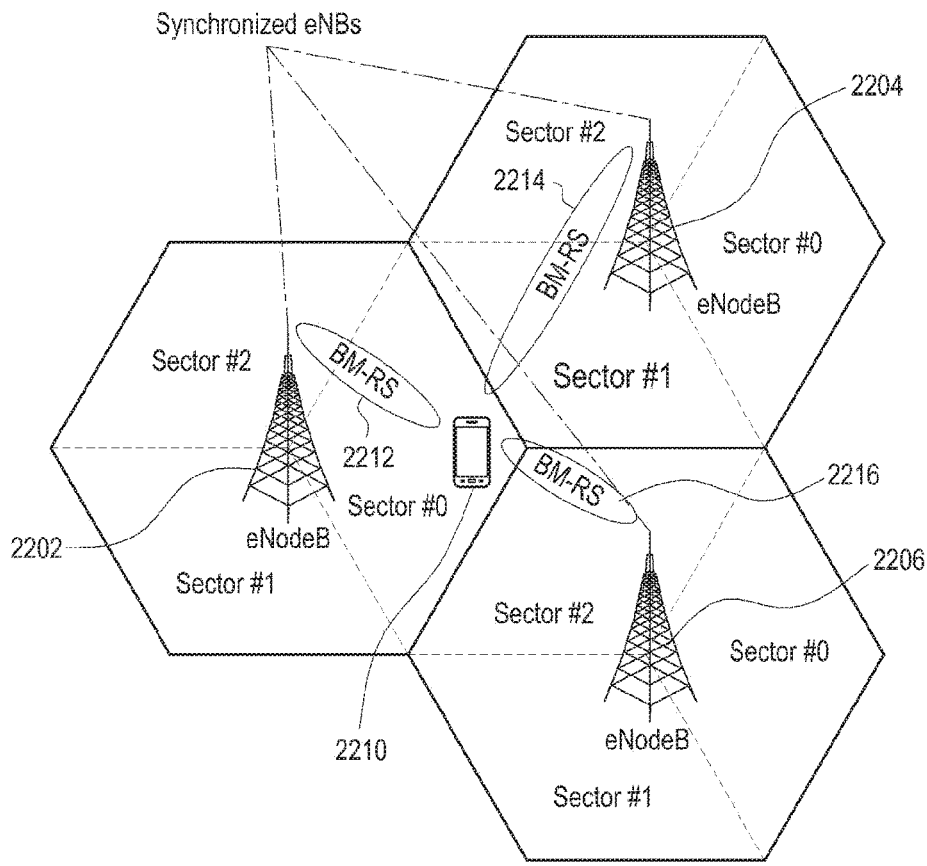
FIG. 22 illustrates an example of a multi-cell environment of an analog beamforming system according to an embodiment of the present disclosure.

FIG. 22 illustrates an example of a multi-cell environment of an analog beamforming system according to an embodiment of the present disclosure.

Referring to FIG. 22, each base station 2202, 2204, and 2206 may transmit signals through transmission beams 2212, 2214, and 2216 of each base station 2202, 2204, and 2206 for covering a cell of each base station 2202, 2204, and 2206 which is classified into three sectors in a multi-cell environment. A terminal 210 may receive signals transmitted through the transmission beams 2212, 2214, and 2216 of the three base stations 2202, 2204, and 2206. As shown in FIG. 22, if the terminal 2210 is affected by the plurality of base stations 2202, 2204, and 2206, the terminal 2210 needs to classify signals of the base stations 2202, 2204, and 2206 to perform a beam search.

In a case that each base station does not use continuously the same transmission beams twice when each base station sweeps a transmission beam, while one base station which a terminal measures uses one transmission beam, transmission beam transition occurs in other base station, so orthogonality among signals of a base station is broken. Due to this, efficiency of beam measurement may decrease by ½.

Figure 23:
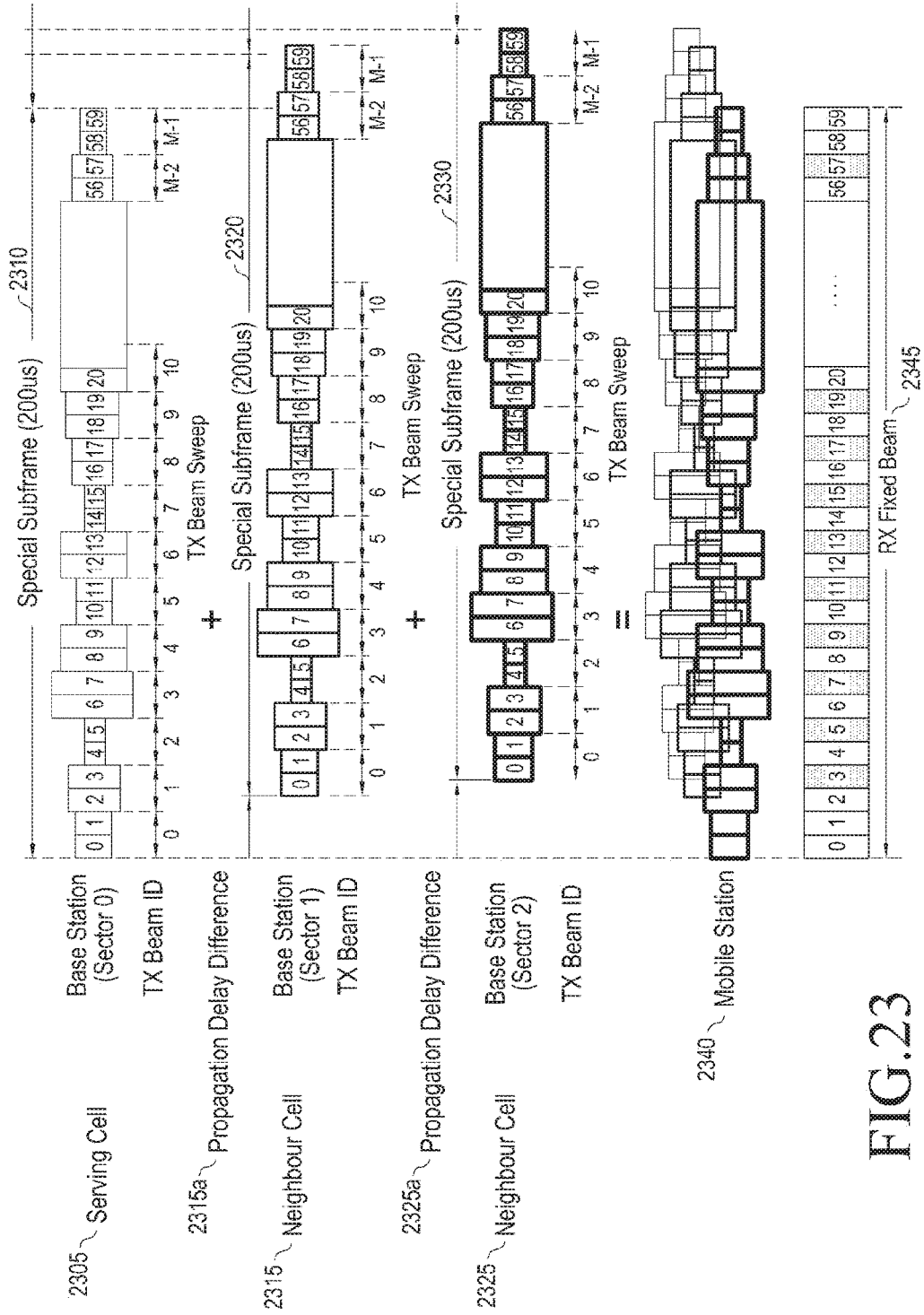
FIG. 23 is a figure for describing transmission beam sweep of a based station in a multi-cell environment according to an embodiment of the present disclosure.

FIG. 23 is a figure for describing transmission beam sweep of a based station in a multi-cell environment according to an embodiment of the present disclosure.

Referring to FIG. 23, a serving cell 2305 is a sector #0 of a base station #0 which a terminal intends to measure, a neighbor cell 2315 is a sector #1 of a base station #1, and a neighbor cell 2325 is a sector #2 of a base station #2. Each cell 2305, 2315, and 2325 may transmit a reference signal while transiting transmission beams per sub-symbol during a special sub-frame 2310, 2320, 2330 of each cell 2305, 2315, and 2325. There is propagation delay difference 2315a and 2325a among signals of cells 2305, 2315, and 2325, so reference signals transmitted from the cells 2305, 2315, and 2325 are arrived at a terminal 2340 with time difference. Even though the terminal 2340 fixes a reception beam 2345 and receives the reference signals, channel information for each beam combination which the terminal 2340 measures may have an error.

Figure 24:
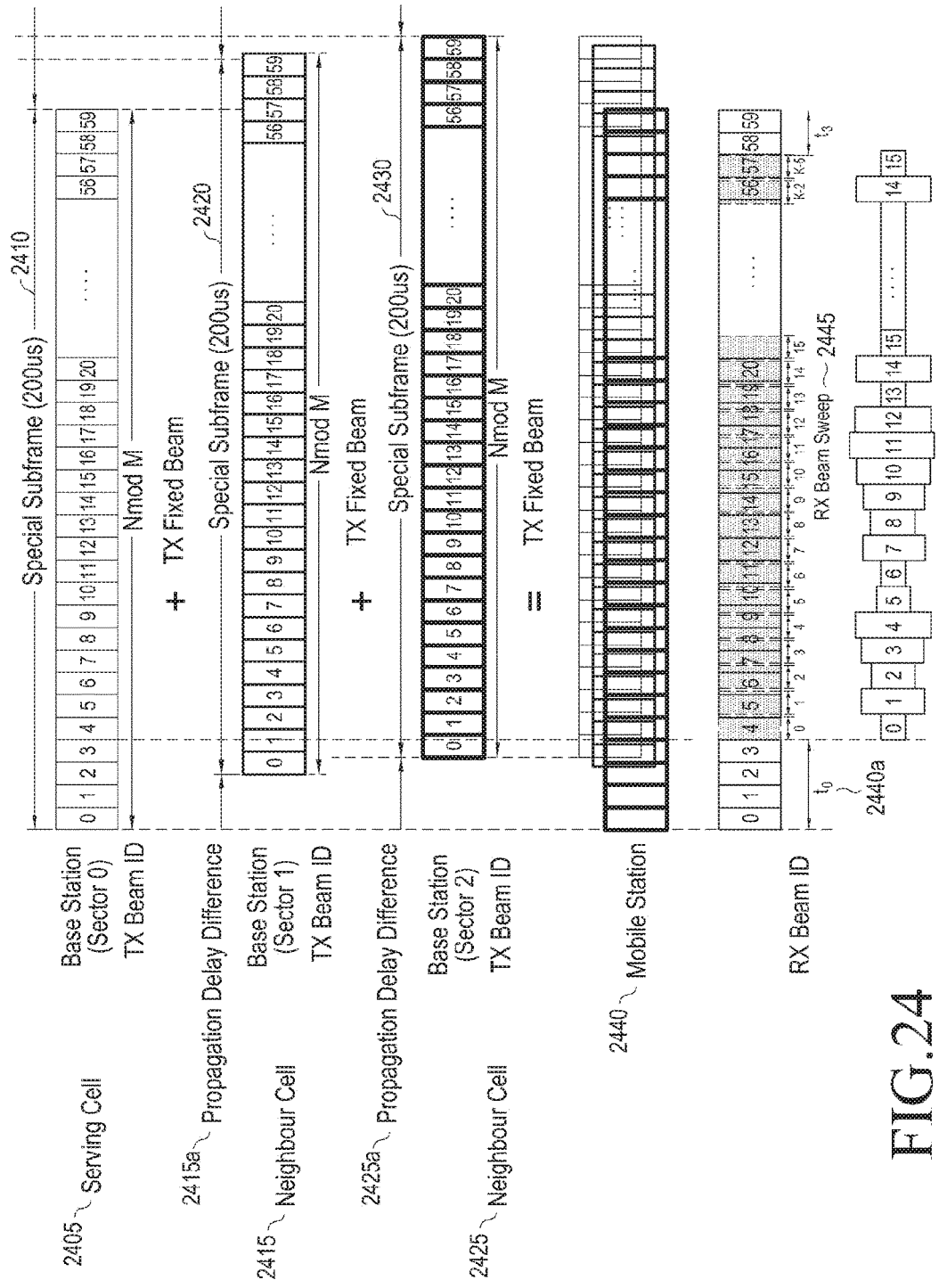
FIG. 24 is a figure for describing reception beam sweep of a terminal in a multi-cell environment according to an embodiment of the present disclosure.

FIG. 24 is a figure for describing reception beam sweep of a terminal in a multi-cell environment according to an embodiment of the present disclosure.

Referring to FIG. 24, a serving cell 2405 is a sector #0 of a base station #0 which a terminal intends to measure, a neighbor cell 2415 is a sector #1 of a base station #1, and a neighbor cell 2425 is a sector #2 of a base station #2. Each cell 2405, 2415, and 2425 may transmit a reference signal through one fixed transmission beam during a special sub-frame 2410, 2420, and 2430 of each cell 2405, 2415, and 2425. There is propagation delay difference 2415a and 2425a among signals of cells 2405, 2415, and 2425, so reference signals transmitted from the cells 2405, 2415, and 2425 are arrived at a terminal 2440 with time difference. The terminal 2440 does not perform beam measurement during first t0 time 2440a of the special subframe 2410, and receives the reference signals while transiting reception beams 2445 by sub-symbol basis after the t0 time 2440a. Based on the channel measurement for the reference signals, the terminal 2440 may obtain channel information for beam combinations of a fixed transmission beam of each cell 2405, 2415, and 2425 and reception beams of the terminal 2440. The t0 time 2440a may be determined such that the t0 time 2440a is at least greater than sum of pre-measured channel delay spread and a timing margin which corresponds to difference of arrival time among neighbor base stations. The timing margin may be obtained by measuring difference of arrival time for signals of the neighbor base stations in a terminal.

As described above, in a multi-cell environment, a terminal performs reception beam sweep while transmission beams of base stations are fixed within one subframe, so the terminal may rapidly perform a beam measurement while waiting for only minimum beam transition time like as a single-cell environment.

As an embodiment, for obtaining orthogonality among signals of a base station and minimizing interference, base stations may perform transmission with a frequency division multiplex (FDM) scheme using different frequency bands or use a reference signal which consists of an orthogonal code such as a Zadoff-Chu (ZC) sequence, a gold sequence, and/or the like such as base station signals are not overlapped one another on a frequency domain.

Even though embodiments have been described for a downlink, a method similar to this may be used for uplink measurement.

Figure 25:
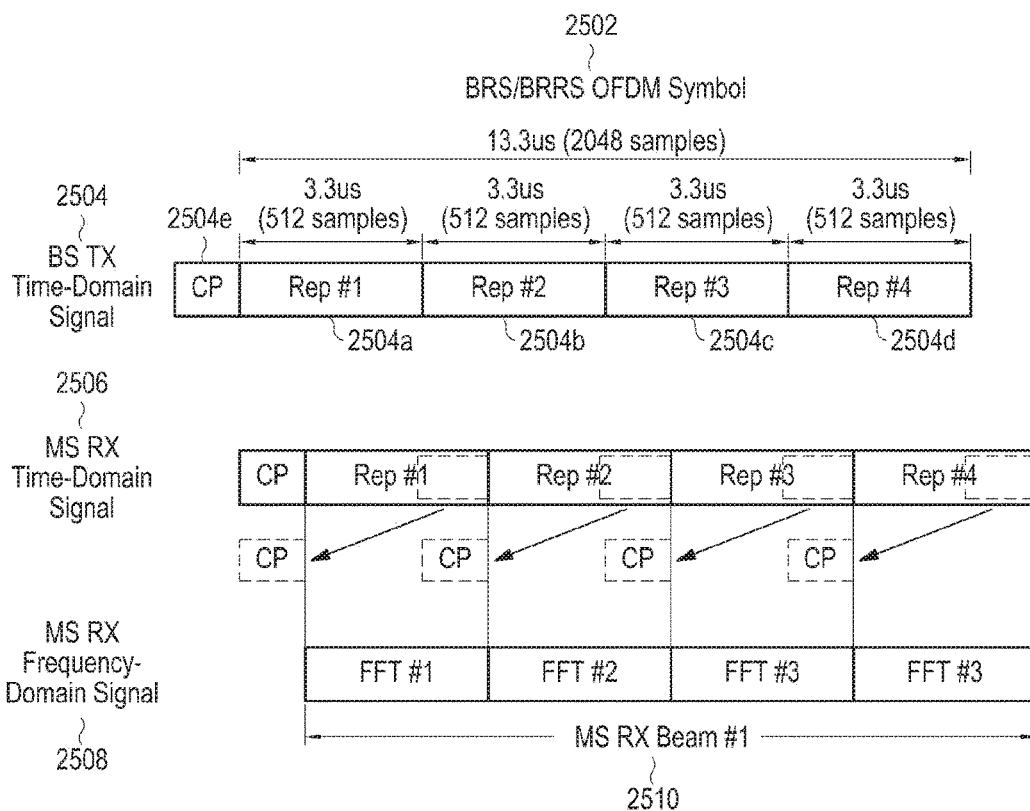
FIG. 25 is a figure for describing an operation of using a reference signal for a beam search for base station synchronization according to an embodiment of the present disclosure.

FIG. 25 is a figure for describing an operation of using a reference signal for a beam search for base station synchronization according to an embodiment of the present disclosure.

Referring to FIG. 25, a base station repetitively transmits the same patterns 2504a, 2504b, 2504c, and 2504d four times during four sub-symbol durations within a time domain signal 2504 of an OFDM symbol 2502 which is designated to include a reference signal. In the first duration of the OFDM symbol 2502, a CP 2504e is transmitted. Reference signs 2506 and 2508 indicate a received reference signal of a terminal on a time domain and a received reference signal of the terminal on a frequency domain. The terminal may synchronize with the base station using the reference signal for a beam search, i.e., a BRS/BRRS if necessary.

If the terminal does not transition a reception beam and receives a signal using one fixed reception beam 2510 (in a reception beam direction as best as possible) during the duration of the OFDM symbol 2502, the terminal may continuously obtain signals of the same pattern transmitted by the base station up to four times.

The terminal may measure a Carrier Frequency Offset (CFO) or a Sampling Frequency Offset (SFO) due to an Oscillator (OSC) deviation between the base station and the terminal using phase difference among the obtained signals.

That is, the terminal may estimate a CFO from phase difference of a total frequency band and estimate an SFO using a phase slope of a frequency band.

Figure 26:
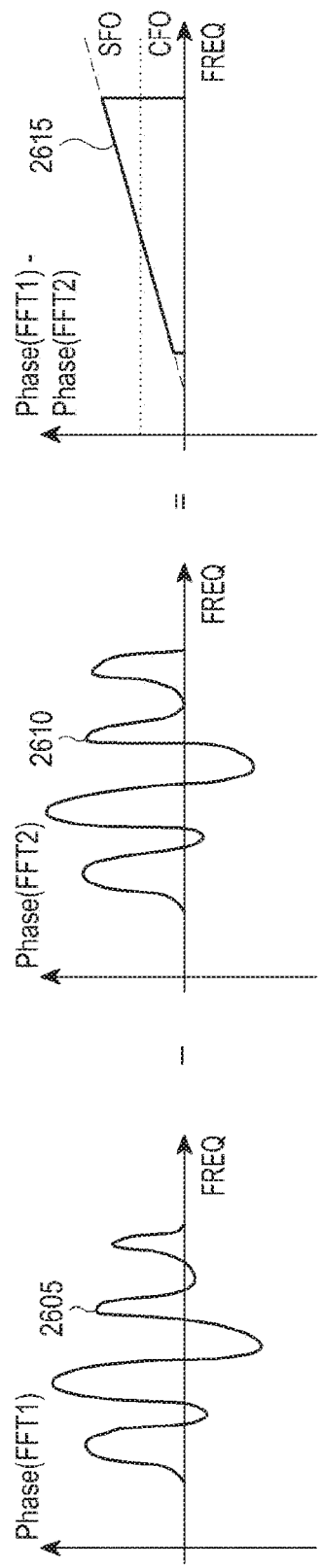
FIG. 26 is a figure for describing measurement of a frequency offset using repeated signals according to an embodiment of the present disclosure.

FIG. 26 is a figure for describing measurement of a frequency offset using repeated signals according to an embodiment of the present disclosure.

Referring to FIG. 26, a terminal may calculate a phase difference 2615 between a signal 2605 obtained from the first FFT and a signal 2610 obtained from the second FFT, and calculate a CFO and an SFO based on the phase difference 2615.

The terminal may determine whether the terminal performs a beam search or performs synchronization using a reference signal.

Embodiments in which a base station provides a terminal with a reference signal for a beam search have been described above, however, the same method may be applied to a case that a terminal provides a base station with a reference signal.

Embodiments as described above provide a scheme of generating a reference signal and a scheme of effectively operate a beam which enables an effective beam search in an analog beamforming system. Through embodiments as described above, a terminal may adaptively operate a beam search duration if a base station has a multi-antenna, and may receive a reference signal using a fixed reception beam to use the reference signal as a use of synchronization with the base station.

Particular aspects of the present disclosure may be implemented as a computer-readable code in a computer-readable recording medium. The computer-readable recording medium is a predetermined data storage device which can store data which can be read by a computer system. Examples of the computer readable recording medium may include a read-only memory (ROM), a random access memory (RAM), a CD-ROM, a magnetic tape, a floppy disk, an optical data storage device, and a carrier wave (such as data transmission through the Internet). The computer-readable recording medium may be distributed through computer systems connected to the network, and accordingly the computer-readable code is stored and executed in a distributed manner. Further, functional programs, codes and code segments for achieving the present disclosure may be easily interpreted by programmers skilled in the art which the present disclosure pertains to.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be appreciated that the method according to various embodiments of the present disclosure may be implemented by a computer or portable terminal including a controller and a memory, wherein the memory is one example of machine-readable storage media suitable to store a program or programs including instructions for implementing the embodiments of the present disclosure.

Accordingly, the present disclosure includes a program for a code implementing the apparatus and method described in the appended claims of the specification and a machine (a computer or the like)-readable storage medium for storing the program. Further, the program may be electronically carried by any medium such as a communication signal transferred through a wired or wireless connection, and the present disclosure appropriately includes equivalents thereof.

Further, an apparatus according to various embodiments of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

Meanwhile, embodiments of the present disclosure disclosed in the specification and drawings are merely presented to easily describe technical contents of the present disclosure and help the understanding of the present disclosure and are not intended to limit the scope of the present disclosure. Further, the embodiments of the present disclosure as described above are merely illustrative, and it will be understood by those skilled in the art that various modifications and equivalents thereof are possible within the scope of the present disclosure. Therefore, the true technical scope of protection of the present disclosure should be defined by the following appended claims.

What is claimed is:

1. A method for transmitting a reference signal by a base station in a beamforming communication system, comprising:
   generating a reference signal sequence for a reference signal to be used for a beam search;
   mapping the reference signal sequence to modulation symbols which correspond to resource elements with same subcarrier spacing which is predetermined on a frequency domain among resource elements to be used for transmitting the reference signal;
   generating an orthogonal frequency division multiplex (OFDM) signal including the modulation symbols, wherein one OFDM symbol included in the OFDM signal comprises a sequence pattern associated with the reference signal sequence that is repeated a plurality of times over a duration of the one OFDM symbol, and wherein the duration of the one OFDM symbol corresponds to a duration of sub-symbols determined for repetition of the sequence pattern on a time domain; and
   transmitting the OFDM signal using at least one transmission beam among a plurality of transmission beams.

2. The method of claim 1,
   wherein the transmitting of the OFDM signal comprises transmitting the OFDM signal during a predetermined period,
   wherein the predetermined period is divided into a plurality of frame groups based on a number of transmission antennas of the base station, and different transmission beams are used for the transmission antennas during each of the plurality of frame groups, and
   wherein the OFDM signal is received by a terminal during all or a part of the plurality of frame groups based on an operating mode of the terminal, and the operating mode includes one of a single input single output (SISO) mode and a multiple input multiple output (MIMO) mode.

3. The method of claim 1, wherein the reference signal sequence is generated using at least one of a cell identifier (ID) of the base station, a subframe index, or a slot number.

4. The method of claim 1, further comprising:
transmitting configuration information indicating at least one of a resource location or a direction of a transmission beam which are used for transmitting the reference signal through control information or upper layer signaling.

5. The method of claim 1,
wherein the transmitting of the OFDM signal comprises transmitting the OFDM signal using different transmission beams through a plurality of transmission antennas, and
wherein each of the plurality of transmission antennas is configured to transmit the OFDM signal using all transmission beams sequentially during a predetermined period.

6. The method of claim 1, wherein the reference signal sequence is defined as the following equation, $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{DL} - 1$$

$$c_{init} = 2^{10} \cdot (7 \cdot (n_s + 1) + l + 1) \cdot (2 \cdot N_{ID}^{cell} + 1) + 2 \cdot N_{ID}^{cell} + 1$$

where the reference signal sequence is mapped to a modulation symbol according to the following equation, $$\begin{cases} a_{k,l}^{(p)} = 0, & \text{if } k \bmod 4 \neq 0 \\ a_{k,l}^{(p)} = r_{l,n_s}(m), & \text{if } k \bmod 4 = 0 \end{cases}$$

$$m = 0, 1, \ldots, N_{RB}^{DL} \cdot N_{sc}^{RB}/4 - 1$$

where, k and l denote indexes on the frequency domain and indexes on the time domain, respectively, p and $n_s$ denote an antenna port number and a slot number, respectively, $N_{ID}^{cell}$ and $N_{RB}^{DL}$ denote a cell identifier (ID) and a number of downlink resource blocks (RBs), $r_{l,n_s}(m)$ is an mth reference signal sequence, and $a_{k,l}^{(p)}$ denotes a modulation symbol which is carried through a kth subcarrier.

7. A method for receiving a reference signal by a terminal in a beamforming communication system, comprising:
receiving, from a base station, an orthogonal frequency division multiplex (OFDM) signal including a reference signal sequentially using a plurality of reception beams, wherein the OFDM signal is configured such that a sequence pattern associated with the reference signal is repeated a plurality of times over a duration of one OFDM symbol included in the OFDM signal, and wherein the duration of the one OFDM symbol corresponds to a duration of sub-symbols determined for repetition of the sequence pattern on a time domain;
performing fast fourier transform (FFT) operations on signals of the sub-symbol durations of the OFDM signal;
generating channel information which corresponds to the plurality of reception beams using signals which are obtained through the FFT operations; and
selecting a reception beam from among the plurality of reception beams using the channel information.

8. The method of claim 7,
wherein the receiving of the OFDM signal comprises receiving the OFDM signal during all or a part of a plurality of frame groups based on an operating mode of the terminal, the operating mode including one of a single input single output (SISO) mode and a multiple input multiple output (MIMO) mode, and
wherein the plurality of frame groups are generated by dividing a predetermined period based on a number of transmission antennas of the base station, and different transmission beams are used for the transmission antennas during each of the plurality of frame groups.

9. The method of claim 7, further comprising:
receiving, from the base station, configuration information indicating at least one of a resource location or a direction of a transmission beam which are used for transmitting the reference signal through control information or upper layer signaling.

10. The method of claim 7, wherein the receiving of the OFDM signal comprises:
receiving a signal of a first sub-symbol duration which starts after a predetermined cyclic prefix (CP) duration or a duration which corresponds to pre-measured channel delay spread on a time domain in the OFDM symbol signal using a first reception beam; and
receiving a signal of a second sub-symbol duration which is after at least beam transition time from the first sub-symbol duration using a second reception beam.

11. The method of claim 10, wherein performing the FFT operations comprises performing FFT on samples included in a signal of each sub-symbol duration and performing phase correction on a signal obtained through the FFT operation.

12. The method of claim 10, wherein the first sub-symbol duration is determined to be started from a sum of the pre-measured channel delay spread and a timing margin which corresponds to arrival time difference among neighbor base stations in the OFDM symbol signal.

13. The method of claim 7, wherein receiving of the OFDM signal comprises:
in a case that terminal operates in a single input single output (SISO) mode, receiving the OFDM signal during one frame group among a plurality of frame groups, and
in a case that the terminal operates in a multiple input multiple output (MIMO) mode, receiving the OFDM signal during the plurality of frame groups,
wherein the plurality of frame groups are generated by dividing a predetermined period based on a number of transmission antennas of the base station, and different transmission beams are used for the transmission antennas during each of the plurality of frame groups.

14. The method of claim 7, further comprising:
receiving the OFDM signal using one fixed reception beam; and
performing synchronization with the base station using the OFDM signal which is received using the one fixed reception beam.

15. A base station in a beamforming communication system, the base station comprising:
at least one processor configured to:
generate a reference signal sequence for a reference signal to be used for a beam search, to map the reference signal sequence to modulation symbols which correspond to resource elements with same subcarrier spacing which is predetermined on a frequency domain among resource elements to be used for transmitting the reference signal, and generate an orthogonal frequency division multiplex (OFDM) signal including the modulation symbols, wherein one OFDM symbol included in the OFDM symbol signal comprises a sequence pattern that is repeated a plurality of times over a duration of the one OFDM symbol, and wherein the duration of the one OFDM symbol corresponds to a duration of sub-symbols determined for repetition of the sequence pattern on a time domain; and a transceiver configured to transmit the OFDM signal using at least one transmission beam among a plurality of transmission beams.

16. The base station of claim 15,
wherein the transceiver is further configured to transmit the OFDM signal during a predetermined period,
wherein the predetermined period is divided into a plurality of frame groups based on a number of transmission antennas of the base station, and different transmission beams are used for the transmission antennas during each of the plurality of frame groups, and
wherein the OFDM signal is received by a terminal during all or a part of the plurality of frame groups based on an operating mode of the terminal, and the operating mode includes one of a single input single output (SISO) mode and a multiple input multiple output (MIMO) mode.

17. The base station of claim 15, wherein the reference signal sequence is generated using at least one of a cell identifier (ID) of the base station, a subframe index, or a slot number.

18. The base station of claim 15, wherein the transceiver is further configured to transmit configuration information indicating at least one of a resource location or a direction of a transmission beam which are used for transmitting the reference signal through control information or upper layer signaling.

19. The base station of claim 15,
wherein the RF transmitting unit is further configured to transmit the OFDM symbol signal using different transmission beams through a plurality of transmission antennas, and
wherein each transmission antenna is configured to transmit the OFDM symbol signal using all transmission beams sequentially during a predetermined beam search period.

20. The base station of claim 15, wherein the reference signal sequence is defined as the following equation, $$r_{l,n_s}(m) = \frac{1}{\sqrt{2}}(1 - 2 \cdot c(2m)) + j\frac{1}{\sqrt{2}}(1 - 2 \cdot c(2m + 1)),$$

$$m = 0, 1, \ldots N_{RB}^{DL} - 1$$

$$c_{init} = 2^{10} \cdot (7 \cdot (n_s + 1) + l + 1) \cdot (2 \cdot N_{ID}^{cell} + 1) + 2 \cdot N_{ID}^{cell} + 1$$

where the reference signal sequence is mapped to a modulation symbol according to the following equation, $$\begin{cases} a_{k,l}^{(p)} = 0, \text{ if } k \bmod 4 \neq 0 \\ a_{k,l}^{(p)} = r_{l,n_s}(m), \text{ if } k \bmod 4 = 0 \end{cases}$$

$$m = 0, 1, \ldots, N_{RB}^{DL} \cdot N_{sc}^{RB}/4 - 1$$

where, k and l denote indexes on a frequency domain and indexes on a time domain, respectively, p and $n_s$ denote an antenna port number and a slot number, respectively, $N_{ID}^{cell}$ and $N_{RB}^{DL}$ denote a cell identifier (ID) and a number of downlink resource blocks (RBs), $r_{l,n_s}(m)$ is an mth reference signal sequence, and $a_{k,l}^{(p)}$ denotes a modulation symbol which is carried through a kth subcarrier.

21. A terminal in a beamforming communication system, the terminal comprising:
a transceiver configured to receive, from a base station, an orthogonal frequency division multiplex (OFDM) signal including a reference signal sequentially using a plurality of reception beams, wherein the OFDM signal is configured such that a sequence pattern associated with the reference signal is repeated a plurality of times over a duration of one OFDM symbol included in the OFDM signal, and wherein the duration of the one OFDM symbol corresponds to a duration of sub-symbols determined for repetition of the sequence pattern on a time domain; and
at least one processor configured to:
perform fast fourier transform (FFT) operations on signals of the sub-symbol durations of the OFDM signal,
generate channel information which corresponds to the plurality of reception beams using signals which are obtained through the FFT operations, and
select a reception beam from among the plurality of reception beams using the channel information.

22. The terminal of claim 21,
wherein the transceiver is further configured to receive the OFDM signal during all or a part of a plurality of frame groups based on an operating mode of the terminal, the operating mode including one of a single input single output (SISO) mode and a multiple input multiple output (MIMO) mode, and
wherein the plurality of frame groups are generated by dividing a predetermined period based on a number of transmission antennas of the base station, and different transmission beams are used for the transmission antennas during each of the plurality of frame groups.

23. The terminal of claim 21, wherein the transceiver is further configured to:
receive a signal of a first sub-symbol duration which starts after a predetermined cyclic prefix (CP) duration or a duration which corresponds to pre-measured channel delay spread on a time domain in the OFDM symbol signal using a first reception beam, and
receive a signal of a second sub-symbol duration which is after at least beam transition time from the first sub-symbol duration using a second reception beam.

24. The terminal of claim 23, wherein the at least one processor is further configured to perform FFT on samples included in a signal of each sub-symbol duration and perform phase correction on a signal obtained through the FFT operation.

25. The terminal of claim 23, wherein the first sub-symbol duration is determined to be started from a sum of the pre-measured channel delay spread and a timing margin which corresponds to arrival time difference among neighbor base stations in the OFDM symbol signal.

26. The terminal of claim 21,
wherein the transceiver is further configured to:
in a case that terminal operates in a single input single output (SISO) mode, receive the OFDM signal during one frame group among a plurality of frame groups, and in a case that the terminal operates in a multiple input multiple output (MIMO) mode, receive the OFDM signal during the plurality of frame groups,
wherein the plurality of frame groups are generated by dividing a predetermined period based on a number of transmission antennas of the base station, and different transmission beams are used for the transmission antennas during each of the plurality of frame groups.

* * * * *